(12) United States Patent
Matsumura et al.

(10) Patent No.: US 11,477,769 B2
(45) Date of Patent: Oct. 18, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 58 days.

(21) Appl. No.: 16/975,551

(22) PCT Filed: Feb. 26, 2018

(86) PCT No.: PCT/JP2018/007031
§ 371 (c)(1),
(2) Date: Aug. 25, 2020

(87) PCT Pub. No.: WO2019/163138
PCT Pub. Date: Aug. 29, 2019

(65) Prior Publication Data
US 2020/0404653 A1 Dec. 24, 2020

(51) Int. Cl.
*H04W 72/04* (2009.01)
*H04L 5/00* (2006.01)

(52) U.S. Cl.
CPC ....... *H04W 72/0413* (2013.01); *H04L 5/0016* (2013.01); *H04L 5/0055* (2013.01)

(58) Field of Classification Search
CPC . H04W 72/0413; H04L 5/0016; H04L 5/0055
See application file for complete search history.

(56) References Cited

U.S. PATENT DOCUMENTS

2016/0295561 A1  10/2016  Papasakellariou
2017/0366323 A1  12/2017  Ahn et al.
(Continued)

FOREIGN PATENT DOCUMENTS

CN   107294660 A   10/2017
CN   107736067 A   2/2018
(Continued)

OTHER PUBLICATIONS

Extended European Search Report issued in counterpart European Application No. 18907265.5 dated Sep. 24, 2021 (13 pages).
(Continued)

*Primary Examiner* — Michael J Moore, Jr.
(74) *Attorney, Agent, or Firm* — Osha Bergman Watanabe & Burton LLP

(57) ABSTRACT

In future radio communication systems, an uplink control channel will be transmitted properly. A user terminal comprising, a receiving section that receives at least one downlink assignment, and receives at least one downlink shared channel scheduled by the at least one downlink assignment, and a control section that controls transmission of a delivery acknowledgment signal, by using at least one of an uplink control channel format and mapping of the delivery acknowledgment signal, associated with at least one of whether or not configuration for using a dynamic delivery acknowledgment signal codebook for the at least one downlink shared channel is configured, the number of bits of the delivery acknowledgment signal in response to the at least one downlink shared channel, whether or not the at least one downlink assignment is transmitted by one frequency resource, and the number of codewords for each downlink shared channel.

8 Claims, 16 Drawing Sheets

(56) References Cited

U.S. PATENT DOCUMENTS

| | | | |
|---|---|---|---|
| 2018/0176943 A1 | 6/2018 | Takeda et al. | |
| 2018/0206224 A1* | 7/2018 | Hwang | H04W 72/0413 |
| 2018/0323907 A1 | 11/2018 | Takeda et al. | |
| 2019/0150169 A1* | 5/2019 | Wang | H04W 72/1263 370/329 |
| 2019/0215128 A1* | 7/2019 | Zhang | H04L 1/16 |
| 2020/0022098 A1* | 1/2020 | Takeda | H04L 5/0055 |
| 2020/0358487 A1* | 11/2020 | Yang | H04L 1/1664 |
| 2020/0374046 A1* | 11/2020 | Li | H04L 27/2607 |
| 2022/0104244 A1* | 3/2022 | Matsumura | H04B 7/0695 |

FOREIGN PATENT DOCUMENTS

| | | | | |
|---|---|---|---|---|
| EP | 3297193 A1 * | 3/2018 | | H04L 1/1628 |
| JP | 2017092615 A | 5/2017 | | |
| WO | 2017/187810 A1 | 11/2017 | | |
| WO | WO-2019216620 A1 * | 11/2019 | | H04L 1/1812 |

OTHER PUBLICATIONS

International Search Report issued in PCT/JP2018/007031 dated May 15, 2018 (2 pages).
Written Opinion of the International Searching Authority issued in PCT/JP2018/007031 dated May 15, 2018 (5 pages).
3GPP TS 38.213 V2.0.0; "3rd Generation Partnership Project; Technical Specification Group Radio Access Network NR; Physical layer procedures for control (Release 15)"; Dec. 2017 (12 pages).
Samsung; "DAI transmission for LTE-A TD"; 3GPP TSG RAN WG1 meeting #59bis, R1-100099; Valencia, Spain Jan. 18-22, 2010 (4 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart Japanese Patent Application No. 2020-501992, dated Apr. 5, 2022 (7 pages).
Office Action issued in African Application No. AP/P/2020/012643; dated May 20, 2022 (4 pages).

* cited by examiner

FIG. 2A  MAPPING FROM 1-BIT HARQ-ACK VALUE TO SEQUENCE

| HARQ-ACK VALUE | 0 | 1 |
|---|---|---|
| SEQUENCE CYCLIC SHIFT | 0 | 6 |

FIG. 2B  MAPPING FROM 2-BIT HARQ-ACK VALUE TO SEQUENCE

| HARQ-ACK VALUE | {0,0} | {0,1} | {1,1} | {1,0} |
|---|---|---|---|---|
| SEQUENCE CYCLIC SHIFT | 0 | 3 | 6 | 9 |

FIG. 2C  MAPPING FROM 1-BIT HARQ-ACK VALUE AND POSITIVE SR TO SEQUENCE

| HARQ-ACK VALUE | 0 | 1 |
|---|---|---|
| SEQUENCE CYCLIC SHIFT | 3 | 9 |

FIG. 2D  MAPPING FROM 2-BIT HARQ-ACK VALUE AND POSITIVE SR TO SEQUENCE

| HARQ-ACK VALUE | {0,0} | {0,1} | {1,1} | {1,0} |
|---|---|---|---|---|
| SEQUENCE CYCLIC SHIFT | 1 | 4 | 7 | 10 |

FIG. 7A  MAPPING FROM 1-BIT HARQ-ACK VALUE TO SEQUENCE

| HARQ-ACK VALUE | 0 | 1 |
|---|---|---|
| SEQUENCE CYCLIC SHIFT | 0 | 6 |

FIG. 7B  MAPPING FROM 2-BIT HARQ-ACK VALUE TO SEQUENCE

| HARQ-ACK VALUE | {0,0} | {0,1} | {1,0} | {1,1} |
|---|---|---|---|---|
| SEQUENCE CYCLIC SHIFT | 0 | 3 | 6 | 9 |

FIG. 7C  MAPPING FROM 1-BIT HARQ-ACK VALUE AND POSITIVE SR TO SEQUENCE

| HARQ-ACK VALUE | 0 | 1 |
|---|---|---|
| SEQUENCE CYCLIC SHIFT | 1 | 7 |

FIG. 7D  MAPPING FROM 2-BIT HARQ-ACK VALUE AND POSITIVE SR TO SEQUENCE

| HARQ-ACK VALUE | {0,0} | {0,1} | {1,0} | {1,1} |
|---|---|---|---|---|
| SEQUENCE CYCLIC SHIFT | 1 | 4 | 7 | 10 |

FIG. 9A  MAPPING FROM 1-BIT HARQ-ACK VALUE TO SEQUENCE

| HARQ-ACK VALUE | 0 | 1 |
|---|---|---|
| SEQUENCE CYCLIC SHIFT | 0 | 6 |

FIG. 9B  MAPPING FROM 2-BIT HARQ-ACK VALUE TO SEQUENCE

| HARQ-ACK VALUE | {0,0} | {0,1} | {1,1} | {1,0} |
|---|---|---|---|---|
| SEQUENCE CYCLIC SHIFT | 0 | 3 | 6 | 9 |

FIG. 9C  MAPPING FROM 1-BIT HARQ-ACK VALUE AND POSITIVE SR TO SEQUENCE

| HARQ-ACK VALUE | 0 | 1 |
|---|---|---|
| SEQUENCE CYCLIC SHIFT | 1 | 7 |

FIG. 9D  MAPPING FROM 2-BIT HARQ-ACK VALUE AND POSITIVE SR TO SEQUENCE

| HARQ-ACK VALUE | {0,0} | {0,1} | {1,1} | {1,0} |
|---|---|---|---|---|
| SEQUENCE CYCLIC SHIFT | 1 | 4 | 7 | 10 |

USER TERMINAL AND RADIO COMMUNICATION METHOD

TECHNICAL FIELD

The present invention relates to a user terminal and a radio communication method in next-generation mobile communication systems.

BACKGROUND ART

In the Universal Mobile Telecommunications System (UMTS) network, the specifications of long-term evolution (LTE) have been drafted for the purpose of further increasing high speed data rates, providing lower latency and so on (see non-patent literature 1). In addition, for the purpose of achieving further broadbandization and increased speed beyond LTE, successor systems of LTE (referred to as, for example, "LTE-Advanced (LTE-A)," "Future Radio Access (FRA)," "4G," "5G," "5G+(plus)," "New RAT (NR)," "LTE Rel. 14," "LTE Rel. 15 (or later versions)," and so on) are also under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes each serve as the unit of time for transmitting one channel-encoded data packet, and as the unit of processing in, for example, scheduling, link adaptation, retransmission control (Hybrid Automatic Repeat reQuest (HARQ)) and so on.

Also, in existing LTE systems (for example, LTE Rel. 8 to 13), a user terminal transmits uplink control information (UCI) by using an uplink control channel (for example, Physical Uplink Control CHannel (PUCCH)) or an uplink data channel (for example, Physical Uplink Shared CHannel (PUSCH)). The format of the uplink control channel is referred to as "PUCCH format (PF)" or the like.

Furthermore, in existing LTE systems, a user terminal multiplexes and transmits UL channels and DeModulation Reference Signals (DMRSs) in TTIs of 1 ms. In these 1-ms TTIs, multiple DMRSs of different layers of the same user terminal (or different user terminals) are orthogonal-multiplexed by using cyclic shifts (CSs) and/or orthogonal spreading codes (for example, orthogonal cover codes (OCCs)).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

In future radio communication systems (for example, LTE Rel. 15 and later versions, 5G, 5G+, NR, etc.), when UCI is transmitted using an uplink control channel (for example, PUCCH), the UCI may not be identified accurately by a network (NW, radio base station, gNB, etc.) unless the PUCCH is transmitted properly.

The present invention has been made in view of the above, and it is therefore an object of the present invention to provide a user terminal and a radio communication method, whereby an uplink control channel can be transmitted properly.

Solution to Problem

In accordance with one aspect of the present invention, a user terminal has a receiving section that receives at least one downlink assignment, and receives at least one downlink shared channel scheduled by the at least one downlink assignment, and a control section that controls transmission of a delivery acknowledgment signal, by using at least one of an uplink control channel format and mapping of the delivery acknowledgment signal, associated with at least one of whether or not configuration for using a dynamic delivery acknowledgment signal codebook for the at least one downlink shared channel is configured, the number of bits of the delivery acknowledgment signal in response to the at least one downlink shared channel, whether or not the at least one downlink assignment is transmitted by one frequency resource, and the number of codewords for each downlink shared channel.

Advantageous Effects of Invention

According to the present invention, an uplink control channel can be transmitted properly in future radio communication systems.

BRIEF DESCRIPTION OF DRAWINGS

FIG. 2 are diagrams to show examples of first mapping of UCI values and CSs for PF 0;

FIG. 7 are diagrams to show examples of second mapping of UCI values and CSs for PF 0;

FIG. 9 are diagrams to show examples of third mapping of UCI values and CSs for PF 0;

DESCRIPTION OF EMBODIMENTS

Figure 1:
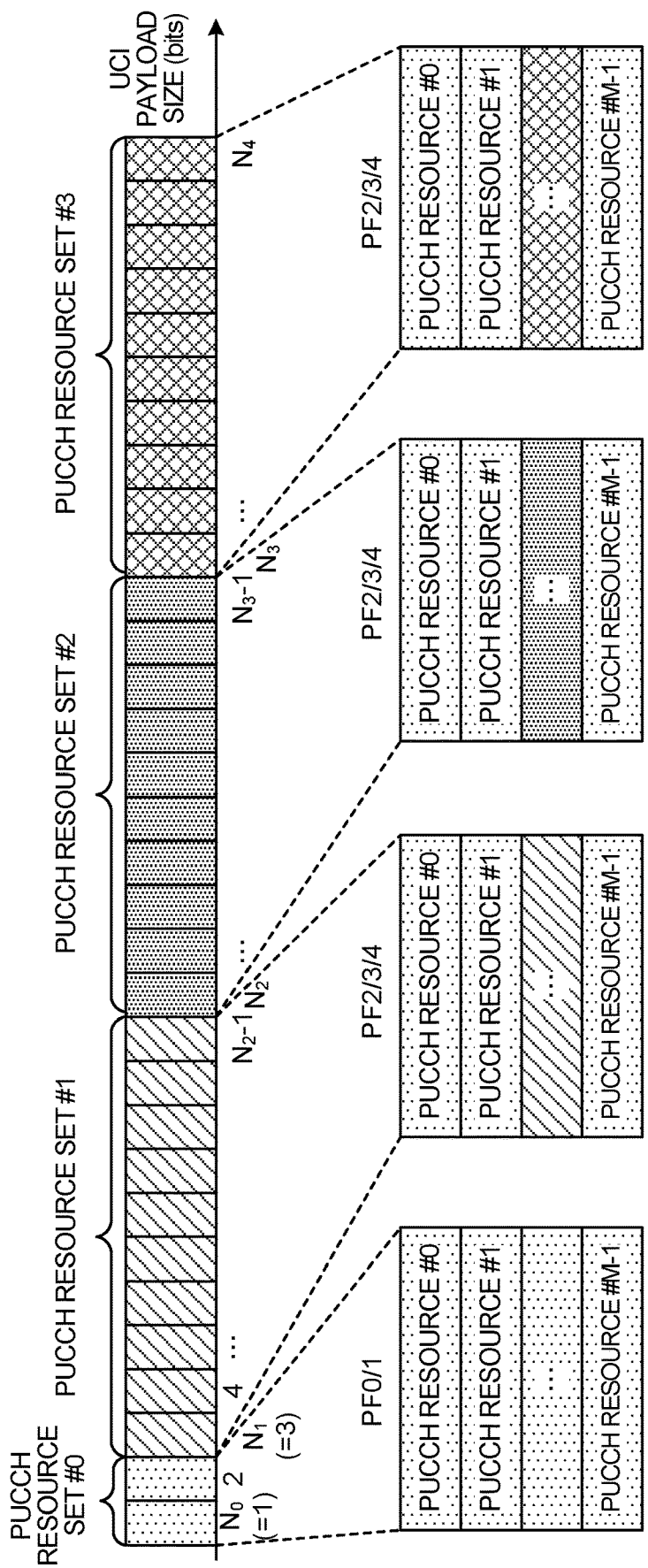
FIG. 1 is a diagram to show an example of allocation of PUCCH resources.

Envisaging future radio communication systems (for example, LTE Rel. 15 and later versions, 5G, NR, etc.), formats for uplink control channels (for example, PUCCH) to use to transmit UCI (also referred to as "PUCCH formats (PFs)," and/or the like) are under study. For example, LTE Rel. 15 is under research to support five types of formats, namely PFs 0 to 4. Note that the names of PFs in the following description are simply examples, and different names may be used.

For example, PFs 0 and 1 are the PFs that are used to transmit UCI of up to two bits (for example, delivery acknowledgment information (also referred to as "HARQ-ACK (Hybrid Automatic Repeat reQuest-ACKnowledgment)," "ACK or NACK," etc.)). PF 0 can be allocated to one or two symbols, and is also referred to as "short PUCCH," "sequence-based short PUCCH" and the like. Meanwhile, PF 1 can be allocated to four to fourteen symbols, and is also referred to as "long PUCCH" and the like. In PF 1, a number of user terminals may be code-division-multiplexed (CDM) by time-domain block-wise spreading, which uses at least one of cyclic shifts (CSs) and orthogonal sequences (for example, Orthogonal Cover Codes (OCCs), time-domain OCCs, etc.) in the same resource block (physical resource block (PRB)).

PFs 2 to 4 are the PFs that are used to transmit UCI of more than two bits (for example, channel state information (CSI) (or CSI and an HARQ-ACK and/or a scheduling request (SR))). PF 2 can be allocated to one or two symbols, and is also referred to as "short PUCCH" or the like. Meanwhile, PFs 3 and 4 can be allocated to four to fourteen symbols, and are also referred to as "long PUCCH" and the like. In PF 4, UCI for a number of user terminals may be code-division-multiplexed (CDM) by using orthogonal sequences (for example, OCCs, pre-DFT OCCs, frequency-domain OCCs, etc.), and by using pre-DFT (frequency-domain) block-wise spreading. In PF 4, UCI for a number of user terminals may be code-division-multiplexed (CDM) by using demodulation reference signals (DMRSs), and by using pre-DFT (frequency-domain) block-wise spreading.

Resources (for example, PUCCH resources) that are used to transmit this uplink control channel are allocated by using higher layer signaling and/or downlink control information (DCI). Here, higher layer signaling may refer to, for example, at least one of RRC (Radio Resource Control) signaling, system information (for example, at least one of RMSI (Remaining Minimum System Information), OSI (Other System Information), MIB (Master Information Block) and SIB (System Information Block)), and broadcast information (PBCH (Physical Broadcast CHannel)).

To be more specific, one or more sets (PUCCH resource sets), each comprised of one or more PUCCH resources, are reported to (configured in) a user terminal via higher layer signaling. For example, K PUCCH resource sets (for example, $1 \leq K \leq 4$) may be reported from the network (NW, radio base station, gNB, etc.) to the user terminal. Each PUCCH resource set may be comprised of M PUCCH resources (for example, $4 \leq M \leq 8$).

The user terminal may select a single PUCCH resource set, out of the K PUCCH resource sets configured, based on the payload size of the UCI (or "UCI payload size"). The UCI payload size may be the number of UCI bits, not including the cyclic redundancy check (CRC) bits.

The user terminal may select a PUCCH resource to use to transmit UCI, out of the M PUCCH resources included in the selected PUCCH resource set, based on at least one of DCI and implicit information (also referred to as "implicit indication information," "implicit index," etc.).

FIG. 1 is a diagram to show an example of allocation of PUCCH resources. Referring to FIG. 1, K=4 holds as an example, and four PUCCH resource sets #0 to #3 are configured from the radio base station to the user terminal via higher layer signaling. Furthermore, PUCCH resource sets #0 to #3 each include M PUCCH resources #0 to #M−1 (for example, $4 \leq M \leq 8$). Note that these PUCCH resource sets may all include the same number of PUCCH resources, or include different numbers of PUCCH resources.

In FIG. 1, each PUCCH resource configured in the user terminal may include at least one of the following parameter values (these parameters may be also referred to as "fields," "information," etc.). Note that, for each parameter, a range of possible values may be defined, per PUCCH format.

The symbol where the PUCCH starts being allocated (the starting symbol, the first symbol, etc.);

The number of symbols allocated to the PUCCH in a slot (the duration allocated to the PUCCH);

The index of the resource block where the PUCCH starts being allocated (the starting PRB, the first (lowest) PRB, etc.) (for example, PUCCH-starting-PRB);

The number of PRBs allocated to the PUCCH (for example, for PF 2 or 3);

Whether frequency hopping is enabled or disabled for PUCCH resources (for example, PUCCH-frequency-hopping);

The frequency resource after frequency hopping (second hop) (for example, the index of the starting PRB or the first (lowest) PRB in a second hop, PUCCH-2nd-hop-PRB, etc.);

The index of the initial cyclic shift (CS) (for example, for PF 0 or 1);

The index of an orthogonal sequence in the time domain (for example, a time-domain OCC) (for example, for PF 1);

The length of the orthogonal sequence (for example, pre-DFT OCC) used in block-wise spreading before discrete Fourier transform (DFT) (also referred to as "pre-DFT OCC length," "spreading factor," etc.) (for example, for PF 4); and The index of the orthogonal sequence (for example, pre-DFT OCC) used in pre-DFT block-wise spreading (for example, for PF 4).

As shown in FIG. 1, when PUCCH resource sets #0 to #3 are configured in a user terminal, the user terminal selects one PUCCH resource set based on UCI payload size.

For example, when the UCI payload size is one or two bits, PUCCH resource set #0 is selected. Also, when the UCI payload size is three bits or more and $N_2-1$ bits or less, PUCCH resource set #1 is selected. Furthermore, when the UCI payload size is $N_2$ bits or more and $N_3-1$ bits or less, PUCCH resource set #2 is selected. Similarly, when the UCI payload size is $N_3$ bits or more and $N_3-1$ bits or less, PUCCH resource set #3 is selected.

In this way, the range of UCI payload size in which PUCCH resource set #i (i=0, . . . , K−1) is selected is expressed as $N_i$ bits or more and $N_{i+1}−1$ bits or less (that is, {$N_i$, . . . , $N_{i+1}−1$} bits).

Here, the starting locations (the numbers of starting bits) $N_0$ and $N_1$ for the UCI payload sizes for PUCCH resource sets #0 and #1 may be 1 and 3, respectively. By this means, PUCCH resource set #0 is selected when UCI of up to two bits is transmitted, so that PUCCH resource set #0 may include PUCCH resources #0 to #M−1 for at least one of PF 0 and PF 1. On the other hand, one of PUCCH resource sets #1 to #3 is selected when UCI of more than two bits is transmitted, so that PUCCH resource sets #1 to #3 may include PUCCH resources #0 to #M−1 for at least one of PF 2, PF 3, and PF 1, respectively.

If i=2, . . . , K−1 holds, information to show the starting location ($N_i$) of the UCI payload size for PUCCH resource set #i (starting location information) may be reported to (configured in) the user terminal by using higher layer signaling. This starting location ($N_i$) may be user terminal-specific. For example, the starting location ($N_i$) may be configured to a value in a range of 4 bits to 256 bits (for example, a multiple of four). For example, referring to FIG. 1, information to show the starting locations ($N_2$ and $N_3$) of the UCI payload sizes for PUCCH resource sets #2 and #3 are reported to the user terminal via higher layer signaling (for example, user-specific RRC signaling), respectively.

The maximum UCI payload size for each PUCCH resource set is given by $N_K−1$. $N_K$ may be explicitly reported to (configured in) the user terminal by higher layer signaling and/or DCI, or may be derived implicitly. For example, in FIG. 1, $N_0=1$ and $N_1=3$ may be specified by the specification, and $N_2$ and $N_3$ may be reported via higher layer signaling. Also, $N_4$ may be specified by the specification (for example, $N_4=1000$).

In the case shown in FIG. 1, the user terminal can select a single PUCCH resource to use to transmit UCI, out of PUCCH resources #0 to #M−1 included in the PUCCH resource set selected based on the UCI payload size, based on the value of a given field in DCI and/or another parameter. For example, when the number of bits in this given field is two, four types of PUCCH resources can be specified. Another parameter may be a CCE index. For example, a PUCCH resource may be associated with a combination of a two-bit DCI and another parameter, or may be associated with a three-bit DCI.

For example, where there are a number of PUCCH resource sets configured by higher layer, if UCI is an HARQ-ACK, the user terminal (User Equipment (UE)) may select one PUCCH resource set based on the UCI payload size, and select one PUCCH resource from the selected PUCCH resource set based on the DCI and/or another parameter. The above-described method of reporting PUCCH resources by using PUCCH resource sets may be also used when UCI is encoded with an HARQ-ACK and another UCI (for example, CSI and/or an SR) and transmitted simultaneously.

On the other hand, when UCI includes no HARQ-ACK, PUCCH resources may be reported without using PUCCH resource sets. For example, if UCI is CSI and/or an SR, the UE may use PUCCH resources that are configured semi-statically by higher layer.

In addition, for NR, studies are underway to allow a user terminal to determine the HARQ-ACK size (HARQ-ACK codebook) semi-statically or dynamically, and perform HARQ-ACK transmission using the PUCCH. For example, the base station reports the method of selecting HARQ-ACK codebooks to the UE via higher layer signaling.

If the mode to select HARQ-ACK codebooks semi-statically is configured (for example, when type 1 is identified), the UE determines the number of HARQ-ACK bits and the like based on configurations configured by higher layer signaling. Configurations configured by higher layer signaling (which may be also referred to as "higher-layer configurations") may include, for example, the maximum number of DL transmissions (for example, PDSCHs) scheduled over a range associated with the timing for HARQ-ACK feedback.

The range associated with the timing for HARQ-ACK feedback corresponds to at least one (or, for example, all) of space, time and frequency. Also, the range associated with the timing for HARQ-ACK feedback is also referred to as a "HARQ-ACK bundling window," a "HARQ-ACK feedback window," a "bundling window," a "feedback window," and so forth.

Meanwhile, if the mode for selecting HARQ-ACK codebooks dynamically is configured (for example, when type 2 is identified), the UE may determine the number of HARQ-ACK bits and the like based on bits specified by a DL assignment index (DAI (Downlink Assignment Indicator/Index)) field included in downlink control information (for example, a DL assignment).

Furthermore, in NR, a PUCCH format to use when transmitting UCI less than or equal to a given number of bits and a PUCCH format to use when transmitting UCI more than a given number of bits are supported as uplink control channel formats (PUCCH format) to use to transmit HARQ-ACKs. The PUCCH formats to use to transmit UCI less than or equal to a given number of bits (for example, up to two bits) may be referred to as "PUCCH format 0" or "PUCCH format 1" (PF 0 or PF 1). PUCCH formats to use when transmitting UCI more than a given number of bits (for example, more than two bits) may be referred to as "PUCCH formats 2 to 4" (PF 2, PF 3 and PF 4).

For PF 0, study is underway to map a sequence of sequence length 12 to twelve contiguous REs (Resource Elements) in a PRB (Physical Resource Block). A sequence of sequence length 24 or 48 may be used as well. A sequence of PF 0 and another sequence may be multiplexed by using CDM (Code Division Multiplexing) or FDM (Frequency Division Multiplexing). When a sequence of PF 0 is used, cyclic shifts (CSs, phase rotations, etc.) are applied to the base sequence.

The base sequence may be a CAZAC (Constant Amplitude Zero Auto-Correlation) sequence such as a Zadoff-Chu sequence (for example, a low-PAPR (Peak-to-Average Power Ratio) sequence), a sequence defined in the specification (for example, a low-PAPR sequence, a sequence given in a table, etc.), or a sequence based on a CAZAC sequence (CG-CAZAC (Computer-Generated CAZAC) sequence). For example, a PUCCH having a bandwidth of one PRB may use one of a given number of sequences (where the given number may be, for example, 30, 60 or a given value determined from the length of the base sequence) defined in the specification, as a base sequence. The base sequence may be used for UCI, or may be used for the DMRS.

Now, a case in which a PUCCH of PF 0 transmits two-bit UCI by using CSs will be described below. A CS may be represented by an amount of phase rotation, and therefore may be rephrased as a "phase rotation amount." A number of candidates for CSs (CS candidates) assigned to one UE are referred to as a "CS candidate set" ("CS amount set,"

"CS amount pattern," "phase rotation amount candidate set," "phase rotation amount pattern," etc.).

The sequence length of the base sequence is determined by the number M of subcarriers and the number of PRBs (Physical Resource Blocks). When transmitting a PUCCH of PF 0 using a band of one PRB, the sequence length of the base sequence is 12 (=12×1). In this case, twelve amounts of phase rotation $\alpha_0$ to $\alpha_{11}$ (CSs 0 to 11), which are provided at phase intervals of $2\pi/12$ (that is, $\pi/6$), are defined. Twelve sequences obtained by rotating the phase of one base sequence (that is, by applying cyclic shifts) based on each of phase rotation amounts $\alpha_0$ to $\alpha_{11}$ are orthogonal to each other (cross-correlation is 0). Note that phase rotation amounts $\alpha_0$ to $\alpha_{11}$ may be defined based on at least one of the number of subcarriers M, the number of PRBs, and the sequence length of the base sequence. The CS candidate set may include two or more amounts of phase rotation selected from these amounts of phase rotation (cyclic shifts) $\alpha_0$ to $\alpha_{11}$. Indices 0 to 11 of these amounts of phase rotation may be referred to as "CSs (CS indices)."

A PUCCH of PF 0 reports UCI, including at least one of an HARQ-ACK (ACK/NACK, A/N, etc.), CSI and an SR.

For example, if the UCI is one bit that represents an HARQ-ACK, the UCI values of 0 and 1 may correspond to a "NACK" (negative acknowledgment) and an "ACK" (positive acknowledgment), respectively. For example, if the UCI is two bits that represent an HARQ-ACK, the UCI values of 00, 01, 11 and 10 may correspond to a "NACK-NACK," a "NACK-ACK," an "ACK-ACK" and an "ACK-NACK," respectively.

For example, when the UCI is two bits, the UE transmits a signal, to which a CS that corresponds to the value to be transmitted, among four candidates for two-bit UCI (UCI candidates, candidate values, etc.), is applied, by using given time/frequency resources. The time/frequency resources may be time resources (for example, symbols) and/or frequency resources (for example, PRBs).

In the transmission signal generation process for a PUCCH of PF 0, the UE rotates (cyclic-shifts) the phase of base sequences $X_0$ to $X_{M-1}$ of sequence length M based on selected amounts of phase rotation (CSs), and inputs the base sequences having been subjected to phase rotation to a Cyclic Prefix-Orthogonal Frequency Division Multiplexing (CP-OFDM) transmitter, or a Discrete Fourier Transform-Spread-Orthogonal Frequency Division Multiplexing (DFT-S-OFDM) transmitter. The UE transmits the output signals from the CP-OFDM transmitter or the DFT-S-OFDM transmitter.

Next, the decoding of UCI reported by the PUCCH of PF 0 will be described below. Here, although the operation for detecting receipt when UCI is reported by selecting the amount of phase rotation will be described, the same applies to case of reporting UCI by selecting other types of resources (for example, the base sequence, the time/frequency resource, etc.) or a combination of multiple types of resources.

The NW may detect UCI from a received signal by using maximum likelihood detection (which may be referred to as "MLD" or "correlation detection"). To be more specific, the network may generate a replica of each amount of phase rotation that is assigned to the user terminal (phase rotation amount replica) (for example, if the UCI payload size is two bits, the network may generate four patterns of phase rotation amount replicas), and, using the base sequences and the phase rotation amount replicas, generate the waveforms of transmitting signals, in the same way the user terminal does. Also, the network may calculate the correlation between the then-resulting transmitting signal waveform and the received signal waveform received from the user terminal for all of the phase rotation amount replicas, and assume that the phase rotation amount replica with the highest correlation is one that has been transmitted.

To be more specific, the network may multiply each element of received signal sequences of size M after the DFT (M complex-number sequences) by the complex conjugates of transmission signal sequences (M complex-number sequences), which are given by applying phase rotations to the base sequence of the transmission signal based on phase rotation amount replicas, and assume that the phase rotation amount replica, where the resultant absolute value (or the square of the absolute values) of the sum of the M sequences is the largest, has been sent.

Alternatively, the network may generate a number of replicas of transmitting signals to match the maximum number of amounts of phase rotation assigned (twelve for one PRB), and estimate the amount of phase rotation having the highest correlation with a received signal in the same operation as in the above-described MLD. When an amount of phase rotation other than the assigned amounts of phase rotation is estimated, the network may assume that the amount of phase rotation that is closest to the estimated amount of phase rotation among the assigned amounts of phase rotation has been transmitted.

CSs are associated with a number of values of the UCI transmitted by the PUCCH of PF 0. The UE applies a CS corresponding to the value of the UCI to be transmitted, to the initial CS, and applies the resulting CS to the base sequences.

To associate (map) the UCI values for PF 0 and CSs, the following first mapping is being studied.

Figure 3A:
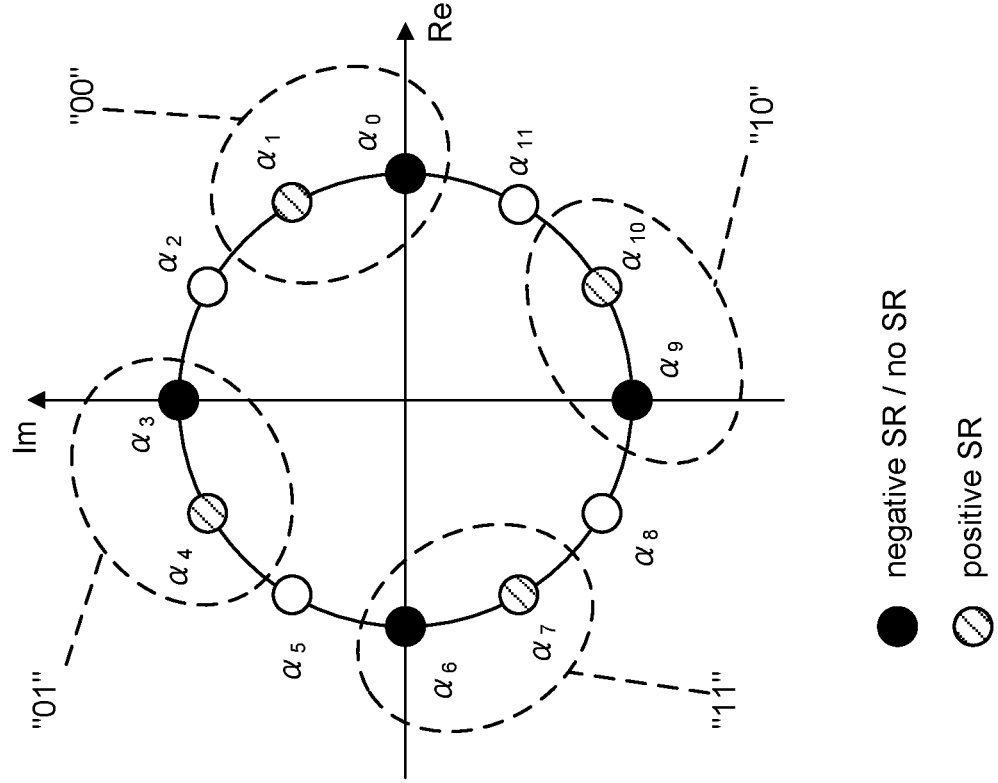
FIG. 3 are diagrams to show examples of phase rotations in first mapping for PF 0.

As shown in FIG. 2A and FIG. 3A, in PF 0, cyclic shifts 0 and 6 may be associated with (mapped to) one-bit HARQ-ACK values 0 and 1, respectively.

Figure 3B:
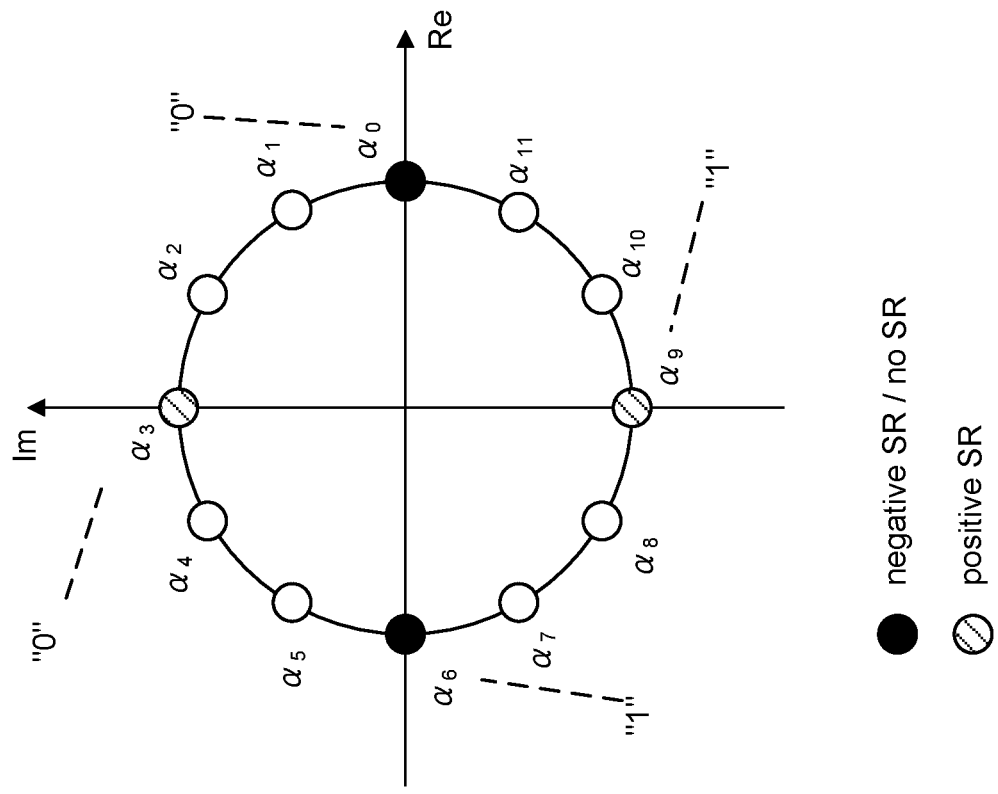

As shown in FIG. 2B and FIG. 3B, in PF 0, cyclic shifts 0, 3, 6 and 9 may be associated with two-bit HARQ-ACK values {0, 0}, {0, 1}, {1, 1} and {1, 0}, respectively.

As shown in FIG. 2C and FIG. 3A, in PF 0, cyclic shifts 3 and 9 may be associated with one-bit HARQ-ACK values 0 and 1 with positive SR, respectively.

As shown in FIG. 2D and FIG. 3B, in PF 0, cyclic shifts 1, 4, 7 and 10 may be associated with two-bit HARQ-ACK values {0, 0}, {0, 1}, {1, 1} and {1, 0} with positive SR, respectively.

Also, UCI values that involve no HARQ-ACK and that represent SR alone may be associated with CSs that are different from CSs that indicate HARQ-ACK alone.

To associate (map) the UCI bit values for PF 1 with complex-valued modulation symbols, the following first mapping is under study.

When UCI of PF 1 is one bit, the complex-valued modulation symbol x to correspond to the UCI value b(i) is given by the following equation:

$$d(i) = \frac{1}{\sqrt{2}}[(1 - 2b(i)) + j(1 - 2b(i))] \quad \text{(Equation 1)}$$

When UCI of PF 1 is two bits, the complex-valued modulation symbol x to correspond to the UCI value b(i) is given by the following equation:

$$d(i) = \frac{1}{\sqrt{2}}[(1 - 2b(i)) + j(1 - 2b(i+1))] \quad \text{(Equation 2)}$$

That is, (1+j)/sqrt(2) and (−1−j)/sqrt(2) may be respectively associated, as two complex-valued modulation symbols x, with 0 and 1, which are one-bit values of b(0), and, in PF 1, (1+j)/sqrt(2), (1−j)/sqrt(2), (−1+j)/sqrt(2) and (−1−j)/sqrt(2) may be respectively associated, as four complex-valued modulation symbols x, with {0, 0}, {0, 1}, {1, 1} and {1, 0}, which are two-bit values of {b(0), b(1)}. Here, sqrt(2) is the square root of two. A PUCCH resource for an HARQ-ACK and a PUCCH resource for an SR may be configured in the UE. When the UE transmits an HARQ-ACK without positive SR, the UE uses the PUCCH resource for the HARQ-ACK to transmit a complex-valued modulation symbol to represent a two-bit HARQ-ACK. When the UE transmits an HARQ-ACK with positive SR, the UE uses the PUCCH resource for the SR to transmit a complex-valued modulation symbol to represent a two-bit HARQ-ACK. Given these two PUCCH resources, the NW may judge whether there is an SR or not based on which PUCCH resource is used.

The problem with HARQ-ACK when two PDCCHs that each carry a DL assignment are transmitted will be described below.

If more than two (three or more) PDCCHs are transmitted, HARQ-ACKs in response to more than two PDSCHs scheduled by those PDCCHs are transmitted in PF 2, PF 3, or PF 4. Therefore, the NW can correctly identify HARQ-ACKs.

When the UE is configured to use a semi-static HARQ-ACK codebook and two PDCCHs that each carry a DL assignment are transmitted (allocated), even if the UE fails to detect one of the two PDCCHs, the UE can still learn that two PDCCHs have been transmitted and which PDCCH has failed to be detected, and the UE transmits a two-bit HARQ-ACK. Therefore, the NW can correctly identify two-bit HARQ-ACKs.

When the UE is configured to use a dynamic HARQ-ACK codebook and two PDCCHs that each carry a DL assignment are transmitted (allocated) in more than one (two or more) serving cells and/or CCs, even if the UE fails to detect one of the two PDCCHs, the UE can still learn, from Downlink Assignment Indicators (DAIs), that two PDCCHs have been transmitted and which PDCCH has failed to be detected, and the UE transmits a two-bit HARQ-ACK. Therefore, the NW can correctly identify two-bit HARQ-ACKs.

Now, a case in which UE is configured to use a dynamic HARQ-ACK codebook, and in which two PDCCHs, each carrying a DL assignment, are transmitted (allocated) in one serving cell and/or CC, and the NW expects to receive a two-bit HARQ-ACK based on two PDCCHs, will be described below. The two PDCCHs in this case are transmitted in different slots or symbols.

If the UE fails to detect the first PDCCH of the two PDCCHs, the UE can still learn, from DAIs, that two PDCCHs have been transmitted and that the first PDCCH has failed to be detected, and the UE transmits a two-bit HARQ-ACK.

However, if the UE fails to detect the second PDCCH of the two PDCCHs, the UE cannot learn, from DAIs, that two PDCCHs have been transmitted or that the second PDCCH has failed to be detected, and the UE transmits a one-bit HARQ-ACK. The NW, expecting to receive a two-bit HARQ-ACK, may misinterpret the HARQ-ACK.

A PDCCH to schedule a PDSCH may carry Downlink Assignment Indicators (DAIs). The DAIs may carry a counter DAI and a total DAI. The total DAI may show the total number of one or more DL assignments arranged along the frequency direction. The counter DAI may show the number (index) of one or more DL assignments (Downlink assignments) arranged along the time direction and/or the frequency direction.

Figure 4:
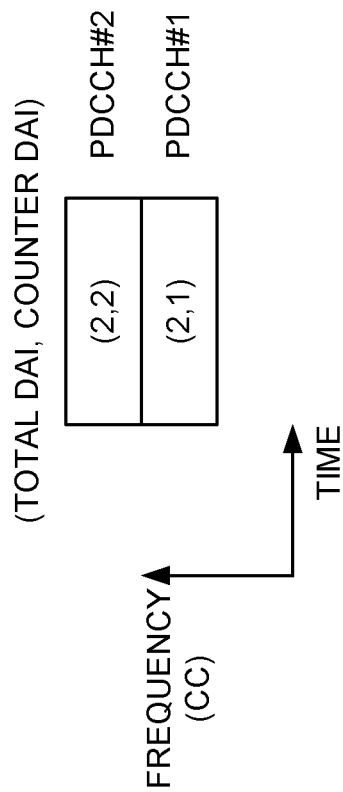
FIG. 4 is a diagram to show examples of DAIs in two PDCCHs that are allocated respectively to two frequency resources.

FIG. 4 shows the DAIs (a total DAI and a counter DAI) for when two PDCCHs, each carrying a DL assignment, are transmitted in more than one serving cell and/or CC (Component Carrier). The DAIs of PDCCH #1 show (2, 1), and the DAIs of PDCCH #2 show (2, 2).

When the UE fails to detect PDCCH #1 and detects PDCCH #2 successfully, the UE detects only one PDCCH with the DAIs (2, 2), and the UE can still learn that the UE has failed to detect the first PDCCH of the two PDCCHs and that the UE has successfully detected the second PDCCH. If the UE detects PDCCH #1 successfully and fails to detect PDCCH #2, the UE detects only one PDCCH with the DAIs (2, 1), and the UE can still learn that the UE has failed to detect the first PDCCH of the two PDCCHs and that the UE has failed to detect the second PDCCH.

Figure 5:
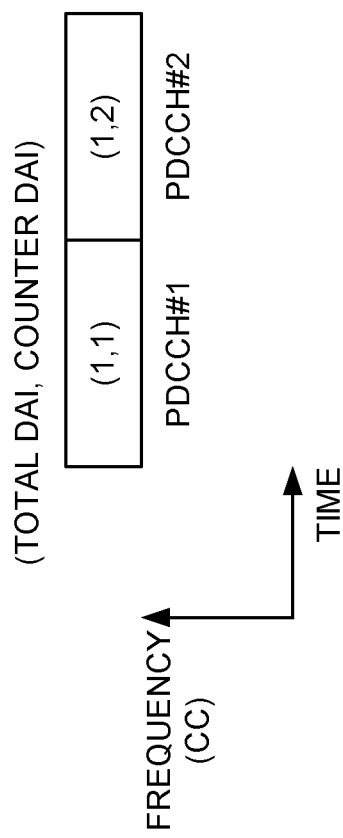
FIG. 5 is a diagram to show examples of DAIs in two PDCCHs that are allocated respectively to two time resources.

FIG. 5 shows the DAIs (a total DAI and a counter DAI) for when two PDCCHs, each carrying a DL assignment, are transmitted in different symbols or slots in one serving cell and/or CC. The DAIs of PDCCH #1 show (1, 1), and the DAIs of PDCCH #2 show (1, 2).

The NW may be unaware that PDCCH #2 is transmitted when PDCCH #1 is transmitted, and therefore the total DAI shows the number of DL assignments in the frequency direction (in the serving cell and/or CC).

When the UE fails to detect PDCCH #1 and detects PDCCH #2 successfully, the UE detects only one PDCCH with the DAIs (1, 2), and the UE can still learn that the UE has failed to detect the first PDCCH of the two PDCCHs and that the UE has successfully detected the second PDCCH. If the UE detects PDCCH #1 successfully and fails to detect PDCCH #2, the UE detects only one PDCCH with the DAIs (1, 1), and the UE can learn that only one PDCCH of the two PDCCHs has been transmitted, and cannot learn that the second PDCCH has failed to be detected.

Figure 6:
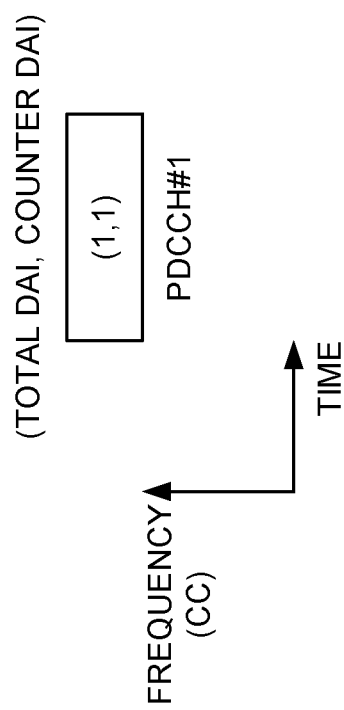
FIG. 6 is a diagram to show examples of DAIs in one PDCCH.

FIG. 6 shows the DAIs (a total DAI and a counter DAI) for when one PDCCH that carries a DL assignment is transmitted. The DAIs of PDCCH #1 show (1, 1). The UE can detect only one PDCCH with the DAIs (1, 1), and learn that there is only one PDCCH.

The problem when, as shown in FIG. 5, two PDCCHs allocated to different time resources (slots or symbols) are transmitted in the same frequency resource (in one serving cell and/or CC), and the first mapping is used, will be described below. PDCCHs #1 and #2 schedule PDSCHs #1 and #2, respectively.

If the UE receives PDCCH #1 and PDSCH #1 successfully, fails to receive PDCCH #2, and transmits an HARQ-ACK without SR (negative SR) based on PF 0, the UE, using a one-bit HARQ-ACK, transmits "1" (ACK) as a one-bit HARQ-ACK in response to PDSCH #1. Since the NW expects to receive a two-bit HARQ-ACK, the NW interprets the one-bit HARQ-ACK "1" (ACK) that is actually received as a two-bit HARQ-ACK {1, 1} (ACK, ACK), based on the first mapping. Therefore, the failed receipt of PDCCH #2 is not correctly reported.

If the UE receives PDCCH #1 successfully, fails to receive PDSCH #1 and PDCCH #2, and transmits an HARQ-ACK with SR (positive SR) based on PF 0, the UE, using a one-bit HARQ-ACK, transmits "0" (NACK) as a one-bit HARQ-ACK in response to PDSCH #1. Since the NW expects to receive a two-bit HARQ-ACK, the NW interprets the one-bit HARQ-ACK "0" (NACK) with SR that is actually received, as a two-bit HARQ-ACK {0, 1}

(NACK, ACK) without SR, based on the first mapping. Therefore, the failed receipt of PDCCH #2 is not correctly reported.

Note that, when the UE is configured to use a semi-static HARQ-ACK codebook, even When the UE fails to detect PDCCH #1 and/or #2, the UE can still learn which PDCCH has failed to be detected, and the UE transmits a two-bit HARQ-ACK. Therefore, the NW can correctly identify two-bit HARQ-ACKs.

If the UE fails to detect both of PDCCHs #1 and #2 and no SR is found, the UE transmits no PUCCH. In this case, the NW detects DTX (Discontinuous Transmission). Therefore, the NW can correctly identify DTX. If the UE fails to detect both of PDCCHs #1 and #2 and an SR is found, the UE transmits the SR and DTX by using a signal constellation corresponding to an SR of PF 1 and NACK, or by using CS corresponding to an SR of PF 0. Therefore, the NW can correctly identify the SR and DTX.

As described above, a problem arises when the UE reports HARQ-ACKs in response to two PDCCHs that are arranged along the time direction based on the first mapping. So, the present inventors have worked on a method of reporting HARQ-ACKs, and arrived at the present invention.

Now, embodiments of the present invention will be described below in detail. The embodiments described below may be each used alone, or may be used in combinations.

In the following description, the case in which the UE detects one PDCCH from one frequency field (serving cell and/or CC) may be replaced with the case in which an HARQ-ACK is provided from one PDSCH that is scheduled by one PDCCH and that has one Multiple-Input and Multiple-Output (MIMO) layer (space layer). The case where the UE detects two PDCCHs from two frequency fields (serving cells and/or CCs) may be replaced with the case in which an HARQ-ACK is provided from one PDSCH that is scheduled by one PDCCH and that has two MIMO layers.

Furthermore, the operations of two, namely the UE and the NW, may be reversed. That is, in the above-described case in which the UE uses a PUCCH format (PF 0 or PF 1) for UCI of up to two bits, the UE may use a PUCCH format (PF 2, PF 3 or PF 4) for UCI of more than two bits, and, in the above-described case in which the UE uses a PUCCH format (PF 2, PF 3 or PF 4) for UCI of more than two bits, the UE may use a PUCCH format (PF 0 or PF 1) for UCI of up to two bits.

When the UE uses a PUCCH format for UCI of up to two bits, this may mean that the UE selects (determines) a PUCCH resource from PUCCH resource set #0. When the UE uses a PUCCH format for UCI of up to two bits, this may mean that the UE selects (determines) a PUCCH resource from PUCCH resource sets #1 to #3.

First Embodiment

With a first embodiment of the present invention, if UE transmits an HARQ-ACK of up to two bits, the UE uses a PUCCH format and/or a PUCCH resource set that are suitable for the situation (PUCCH format determining method).

Embodiment 1-1

The UE may determine the PUCCH format for HARQ-ACK transmission based on whether or not a dynamic HARQ-ACK codebook is used, and/or whether or not one PDCCH is detected from one frequency field (serving cell and/or CC).

UE operations may vary depending on whether the UE is configured to use a semi-static HARQ-ACK codebook or configured to use a semi-static HARQ-ACK codebook.

<<When UE is Configured to Use Semi-Static HARQ-ACK Codebook>>

When the UE is configured to use a semi-static HARQ-ACK codebook, the UE may use a PUCCH format (PF 0 or PF 1) for UCI of up to two bits (one bit or two bits). In this case, the UE may use the PUCCH format for UCI of up to two bits, regardless of whether or not one PDCCH is detected from one frequency field (serving cell and/or CC). The PUCCH format for UCI of up to two bits may be a PUCCH resource set of up to two bits, or PUCCH resource set #0.

According to this PUCCH format determining method, for example, even when the NW transmits PDCCHs #1 and #2 in the time direction and the UE detects PDCCH #1 successfully and fails to detect PDCCH #2, the UE still transmits a two-bit HARQ-ACK, so that the NW can correctly identify two-bit HARQ-ACKs.

<<When UE is Configured to Use Dynamic HARQ-ACK Codebook>>

When the UE is configured to use a dynamic HARQ-ACK codebook, the UE may select different PUCCH formats depending on whether or not one PDCCH is detected from one frequency field (serving cell and/or CC).

When the UE is configured to use a dynamic HARQ-ACK codebook and two PDCCHs are detected from two frequency fields (serving cells and/or CCs), the UE may use a PUCCH format (PF 0 or PF 1) for UCI of up to two bits.

When the UE is configured to use a dynamic HARQ-ACK codebook and one PDCCHs is detected from one frequency field (serving cell and/or CC), the UE may use a PUCCH format (PF 2, PF 3 or PF 4) for UCI of more than two bits.

When the NW transmits PDCCHs #1 and #2 in the time direction, the NW may identify the PUCCH format of the detected PUCCH by performing blind detection for the PUCCHs. If the detected PUCCH uses PF 0 or PF 1, the NW may assume that this PUCCH carries a two-bit HARQ-ACK, and, if the detected PUCCH uses PF 2, PF 3 or PF 4, the NW may assume that this PUCCH carries a one-bit HARQ-ACK.

According to this PUCCH format determining method, even when the UE fails to detect a PDCCH and ends up transmitting a one-bit HARQ-ACK while really a two-bit HARQ-ACK is supposed to be transmitted, it is still possible to prevent the NW from misidentifying the HARQ-ACK.

For example, when the UE is configured to use a dynamic HARQ-ACK codebook, the NW transmits PDCCHs #1 and #2 in the time direction, and the UE detects PDCCH #1 successfully and fails to detect PDCCH #2, the UE transmits a PUCCH to carry a one-bit HARQ-ACK by using PF 2, PF 3, or PF 4. Since the PUCCH has been received in PF 2, PF 3, or PF 4, the NW can recognize that the PUCCH indicates a one-bit HARQ-ACK, and the NW can recognize that one of PDSCH #1, scheduled by PDCCH #1 and PDSCH #2, scheduled by PDCCH #2 has failed to be received.

Embodiment 1-2

The UE may determine the PUCCH format for HARQ-ACK transmission based on whether or not one PDCCH is detected from one frequency field (serving cell and/or CC).

In this case, the UE may operate the same regardless of whether or not a dynamic HARQ-ACK codebook is used.

The UE may select different PUCCH formats depending on whether or not one PDCCH is detected from one frequency field (serving cell and/or CC).

If the UE detects two PDCCHs from two frequency fields (serving cells and/or CCs), the UE may use a PUCCH format (PF 0 or PF 1) for UCI of up to two bits.

If the UE detects one PDCCH from one frequency field (serving cell and/or CC), the UE may use a PUCCH format (PF 2, PF 3 or PF 4) for UCI of more than two bits.

When the NW transmits PDCCHs #1 and #2 in the time direction, the NW may identify the PUCCH format of the detected PUCCH by performing blind detection for the PUCCHs. If the detected PUCCH uses PF 0 or PF 1, the NW may assume that this PUCCH carries a two-bit HARQ-ACK, and, if the detected PUCCH uses PF 2, PF 3 or PF 4, the NW may assume that this PUCCH carries a one-bit HARQ-ACK.

According to this PUCCH format determining method, even when the UE fails to detect a PDCCH and ends up transmitting a one-bit HARQ-ACK while really a two-bit HARQ-ACK is supposed to be transmitted, it is still possible to prevent the NW from misidentifying the HARQ-ACK.

For example, if the NW transmits PDCCHs #1 and #2 in the time direction, and the UE detects PDCCH #1 successfully and fails to detect PDCCH #2, the UE transmits a PUCCH to carry a one-bit HARQ-ACK by using PF 2, PF 3, or PF 4. Since the PUCCH has been received in PF 2, PF 3, or PF 4, the NW can recognize that the PUCCH indicates a one-bit HARQ-ACK, and the NW can recognize that one of PDSCH #1, scheduled by PDCCH #1 and PDSCH #2, scheduled by PDCCH #2 has failed to be received.

Embodiment 1-3

The UE may determine the PUCCH format based on whether or not a dynamic HARQ-ACK codebook is used.

When the UE is configured to use a semi-static HARQ-ACK codebook, the UE may use a PUCCH format (PF 0 or PF 1) for UCI of up to two bits.

According to this PUCCH format determining method, for example, even when the NW transmits PDCCHs #1 and #2 in the time direction and the UE detects PDCCH #1 successfully and fails to detect PDCCH #2, the UE still transmits a two-bit HARQ-ACK, so that the NW can correctly identify two-bit HARQ-ACKs.

When the UE is configured to use a dynamic HARQ-ACK codebook, the UE may use a PUCCH format (PF 2, PF 3 or PF 4) for UCI of more than two bits.

When the NW transmits PDCCHs #1 and #2 in the time direction, the NW may identify the PUCCH format of the detected PUCCH by performing blind detection for the PUCCHs. If the detected PUCCH uses PF 0 or PF 1, the NW may assume that this PUCCH carries a two-bit HARQ-ACK, and, if the detected PUCCH uses PF 2, PF 3 or PF 4, the NW may assume that this PUCCH carries a one-bit HARQ-ACK.

According to this PUCCH format determining method, even when the UE fails to detect a PDCCH and ends up transmitting a one-bit HARQ-ACK while really a two-bit HARQ-ACK is supposed to be transmitted, it is still possible to prevent the NW from misidentifying the HARQ-ACK.

For example, when the UE is configured to use a dynamic HARQ-ACK codebook, the NW transmits PDCCHs #1 and #2 in the time direction, and the UE detects PDCCH #1 successfully and fails to detect PDCCH #2, the UE transmits a PUCCH to carry a one-bit HARQ-ACK by using PF 2, PF 3, or PF 4. Since the PUCCH has been received in PF 2, PF 3, or PF 4, the NW can recognize that the PUCCH indicates a one-bit HARQ-ACK, and the NW can recognize that one of PDSCH #1, scheduled by PDCCH #1 and PDSCH #2, scheduled by PDCCH #2 has failed to be received.

Second Embodiment

A second embodiment of the present invention uses second mapping, which is different from the first mapping.

Embodiment 2-1

Embodiment 2-1 will describe second mapping for PF 0.

Figure 8B:
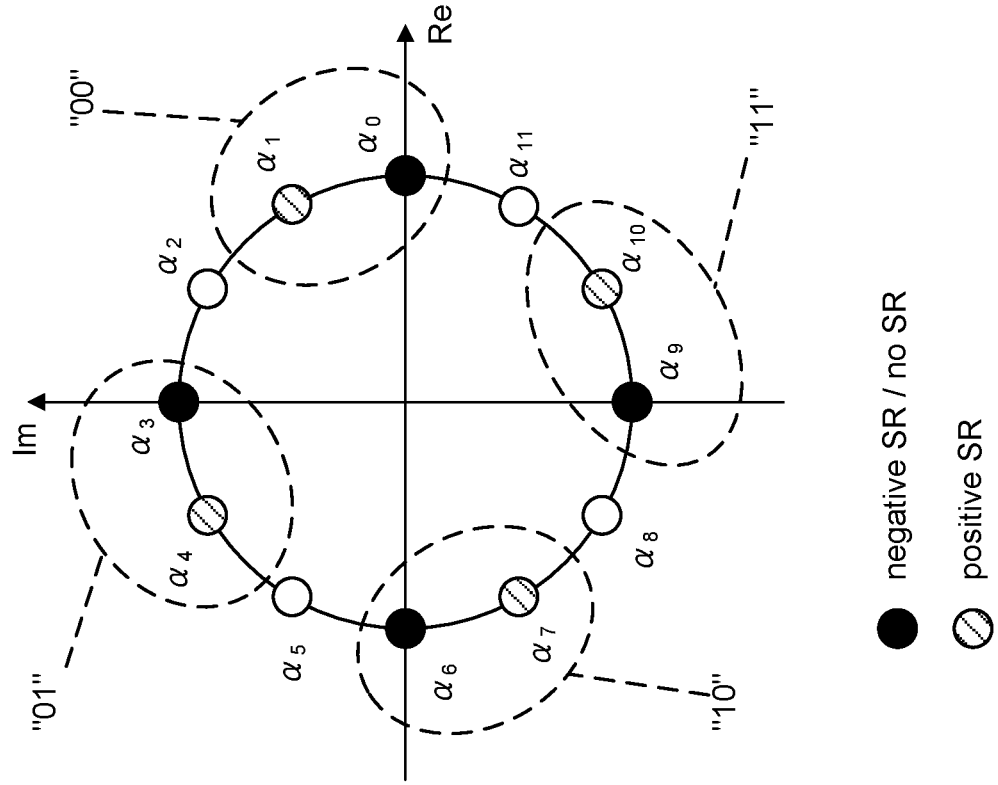
FIG. 8 are diagrams to show examples of phase rotations in second mapping for PF 0.
Figure 8A:
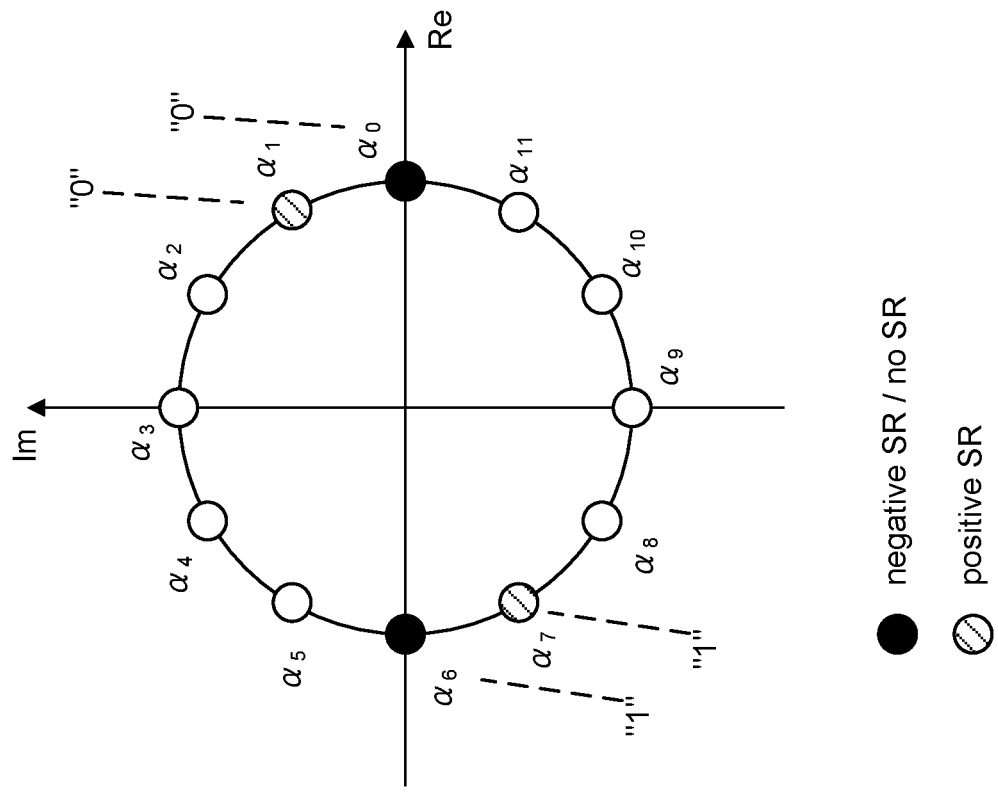

As shown in FIG. 7A and FIG. 8A, as in the case of the first mapping, in PF 0, cyclic shifts 0 and 6 may be associated with (mapped to) one-bit HARQ-ACK values 0 and 1, respectively.

As shown in FIG. 7B and FIG. 8B, in PF 0, cyclic shifts 0, 3, 6 and 9 may be associated with two-bit HARQ-ACK values {0, 0}, {0, 1}, {1, 0} and {1, 1}, respectively.

Here, it is sufficient only if the one-bit HARQ-ACK value 0 and the two-bit HARQ-ACK value {0, 0} are associated with the same cyclic shift, and the one-bit HARQ-ACK value 1 and the two-bit HARQ-ACK value {1, 0} are associated with the same cyclic shift. Note that, in PF 0, cyclic shifts 0, 9, 6 and 3 may be associated with two-bit HARQ-ACK values {0, 0}, {0, 1}, {1, 0} and {1, 1}, respectively.

As shown in FIG. 7C and FIG. 8A, in PF 0, cyclic shifts 1 and 7 may be associated with one-bit HARQ-ACK values 0 and 1 with positive SR, respectively.

As shown in FIG. 7D and FIG. 8B, in PF 0, cyclic shifts 1, 4, 7 and 10 may be associated with two-bit HARQ-ACK values {0, 0}, {0, 1}, {1, 0} and {1, 1} with positive SR, respectively.

It is sufficient only if the one-bit HARQ-ACK value 0 and the two-bit HARQ-ACK value {0, 0}, with positive SR, are associated with the same cyclic shift, and the one-bit HARQ-ACK value 1 and the two-bit HARQ-ACK value {1, 0}, with positive SR, are associated with the same cyclic shift. Note that, in PF 0, cyclic shifts 1, 10, 7 and 4 may be associated with two-bit HARQ-ACK values {0, 0}, {0, 1}, {1, 0} and {1, 1} with positive SR, respectively.

According to this mapping, even when the UE fails to detect a PDCCH and ends up transmitting a one-bit HARQ-ACK while really a two-bit HARQ-ACK is supposed to be transmitted, it is still possible to prevent the NW from misidentifying the received HARQ-ACK.

For example, even when the NW transmits PDCCHs #1 and #2 in the time direction, and the UE detects PDCCH #1 successfully and fails to detect PDCCH #2, and transmits a one-bit HARQ-ACK value (0 or 1) that is determined based on PDSCH #1 scheduled by PDCCH #1, the NW identifies this one-bit HARQ-ACK value as a two-bit HARQ-ACK value ({0, 0} or {1, 0}), and therefore the NW can correctly learn that PDSCH #2 has failed to be received.

Embodiment 2-2

Embodiment 2-2 will describe second mapping for PF 1.

In PF 1, complex-valued modulation symbols x may be associated with (mapped to) one-bit and two-bit values b(i) that represent UCI (HARQ-ACK) as follow:

(1+j)/sqrt(2) and (−1−j)/sqrt(2) may be respectively associated, as two complex-valued modulation symbols x, with 0 and 1, which are one-bit values of b(0), and, in PF 1, (1+j)/sqrt(2), (1−j)/sqrt(2), (−1+j)/sqrt(2) and (−1−j)/sqrt(2) may be respectively associated, as four complex-valued modulation symbols x, with {0, 0}, {0, 1}, {1, 0} and {1, 1}, which are two-bit values of {b(0), b(1)}.

Here, it is sufficient only if the one-bit value 0 and the two-bit value {0, 0} are associated with the same complex-valued modulation symbol, and the one-bit value 1 and the two-bit value {1, 0} are associated with the same complex-valued modulation symbol. Therefore, the two complex-valued modulation symbols to be associated with the two-bit values {0, 1} and {1, 1}, respectively, may be opposite to those described above.

According to this mapping, even when the UE fails to detect a PDCCH and ends up transmitting a one-bit HARQ-ACK while really a two-bit HARQ-ACK is supposed to be transmitted, it is still possible to prevent the NW from misidentifying the HARQ-ACK.

For example, even when the NW transmits PDCCHs #1 and #2 in the time direction, and the UE detects PDCCH #1 successfully and fails to detect PDCCH #2, and transmits a one-bit HARQ-ACK value (0 or 1) that is determined based on PDSCH #1 scheduled by PDCCH #1, the NW identifies this one-bit HARQ-ACK value as a two-bit HARQ-ACK value ({0, 0} or {1, 0}), and therefore the NW can correctly learn that PDSCH #2 has failed to be received.

According to the second embodiment, When the UE fails to detect PDCCH #1 and fails to detect PDCCH #2, the UE still does not transmit a PUCCH that carries an HARQ-ACK. The NW expects to receive a two-bit HARQ-ACK and detects DTX, so that the NW can correctly identify the two-bit HARQ-ACK {0, 0}.

According to this second embodiment, When the UE fails to detect PDCCH #1 and detects PDCCH #2 successfully, the UE learns that PDCCH #1 has failed to be detected, and transmits a PUCCH carrying a two-bit HARQ-ACK ({0,0} or {0,1}). The NW expects to receive a two-bit HARQ-ACK and receives that PUCCH, so that the NW can correctly learn that PDSCH #2, scheduled by PDCCH #2, has failed to be received.

According to this second embodiment, when the UE detects PDCCH #1 successfully and fails to detect PDCCH #2, the UE transmits a PUCCH carrying a one-bit HARQ-ACK (0 or 1) in response to PDSCH #2 scheduled by PUCCH #2. The NW expects to receive a two-bit HARQ-ACK and identifies this PUCCH as a two-bit HARQ-ACK ({0, 0} or {1, 0}), so that the NW can correctly learn that PDSCH #2 has failed to be received.

According to this second embodiment, when the UE detects PDCCH #1 successfully and detects PDCCH #2 successfully, the UE transmits a PUCCH carrying a two-bit HARQ-ACK. The NW expects to receive a two-bit HARQ-ACK, and therefore can correctly identify the two-bit HARQ-ACK.

Third Embodiment

A third embodiment of the present invention uses third mapping, which is different from the first mapping. The third mapping for PF 0 will be described below.

Figure 10A:
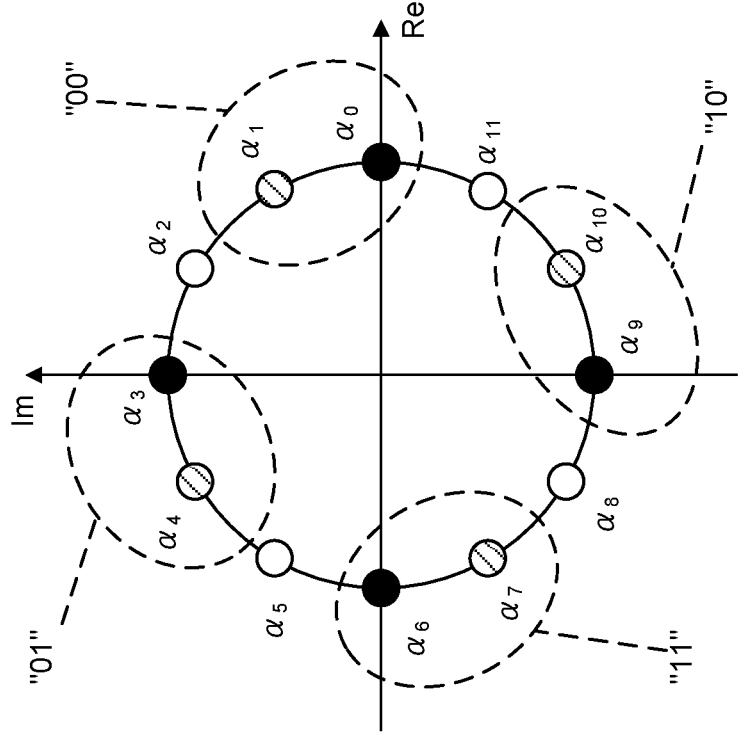
FIG. 10 are diagrams to show examples of phase rotations in third mapping for PF 0.

As shown in FIG. 9A and FIG. 10A, as in the case of the first mapping, in PF 0, cyclic shifts 0 and 6 may be associated with (mapped to) one-bit HARQ-ACK values 0 and 1, respectively.

Figure 10B:
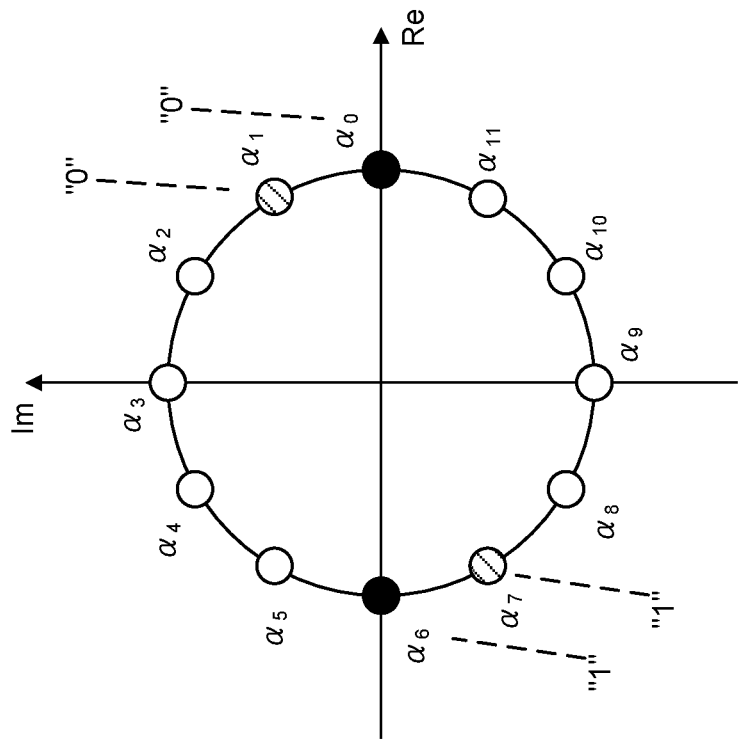

As shown in FIG. 9B and FIG. 10B, as in the case of the first mapping, in PF 0, cyclic shifts 0, 3, 6 and 9 may be associated with two-bit HARQ-ACK values {0, 0}, {0, 1}, {1, 1} and {1, 0}, respectively.

As shown in FIG. 9C and FIG. 10A, in PF 0, cyclic shifts 1 and 7 may be associated with one-bit HARQ-ACK values 0 and 1 with positive SR, respectively.

As shown in FIG. 9D and FIG. 10B, in PF 0, cyclic shifts 1, 4, 7 and 10 may be associated with two-bit HARQ-ACK values {0, 0}, {0, 1}, {1, 1} and {1, 0} with positive SR, respectively.

The one-bit HARQ-ACK value 0 with positive SR and the two-bit HARQ-ACK value {0, 0} with positive SR are associated with the same cyclic shift. The one-bit HARQ-ACK value 1 and the two-bit HARQ-ACK value {1, 1} are associated with the same cyclic shift.

According to the third mapping, changes from the first mapping can be kept minimal. Furthermore, it is possible to reduce the differences between cyclic shifts associated with one-bit HARQ-ACK values with positive SR and cyclic shifts associated with two-bit HARQ-ACK values with positive SR, simplify the UE operations, and reduce the load on the UE.

Fourth Embodiment

With a fourth embodiment of the present invention, if UE transmits an HARQ-ACK of up to two bits, the UE uses mapping that involves UCI and cyclic shifts or complex-valued modulation symbols, and that is suitable for the situation (mapping selection method).

Embodiment 4-1

The UE may select mapping based on whether or not a dynamic HARQ-ACK codebook is used, and/or whether or not one PDCCH is detected from one frequency field (serving cell and/or CC).

UE operations may vary depending on whether the UE is configured to use a semi-static HARQ-ACK codebook or configured to use a semi-static HARQ-ACK codebook.

<<When UE is Configured to Use Semi-Static HARQ-ACK Codebook>>

When the UE is configured to use a semi-static HARQ-ACK codebook, the UE may transmit a PUCCH in a PUCCH format (PF 0 or PF 1) for UCI of up to two bits (one bit or two bits) based on the third mapping. In this case, the UE may use the third mapping regardless of whether or not one PDCCH is detected from one frequency field (serving cell and/or CC). The PUCCH format for UCI of up to two bits may be a PUCCH resource set of up to two bits, or PUCCH resource set #0.

According to this mapping selection method, for example, even when the NW transmits PDCCHs #1 and #2 in the time direction, and the UE detects PDCCH #1 successfully and fails to detect PDCCH #2, the UE still transmits a two-bit HARQ-ACK, so that the NW can correctly identify two-bit HARQ-ACKs.

<<When UE is Configured to Use Dynamic HARQ-ACK Codebook>>

When the UE is configured to use a dynamic HARQ-ACK codebook, the UE may select different mapping depending on whether or not one PDCCH is detected from one frequency field (serving cell and/or CC).

When the UE is configured to use a dynamic HARQ-ACK codebook, and two PDCCHs are detected from two frequency fields (serving cells and/or CCs), the UE may transmit a PUCCH in a PUCCH format (PF 0 or PF 1) for UCI of up to two bits based on the third mapping.

When the UE is configured to use a dynamic HARQ-ACK codebook, and one PDCCH is detected from one frequency field (serving cell and/or CC), the UE may transmit a PUCCH in a PUCCH format (PF 0 or PF 1) for UCI of up to two bits based on the second mapping.

According to this mapping selection method, even when the UE fails to detect a PDCCH and ends up transmitting a one-bit HARQ-ACK while really a two-bit HARQ-ACK is supposed to be transmitted, it is still possible to prevent the NW from misidentifying the HARQ-ACK.

For example, when the UE is configured to use a dynamic HARQ-ACK codebook, the NW transmits PDCCHs #1 and #2 in the time direction, and the UE detects PDCCH #1 successfully and fails to detect PDCCH #2, the UE transmits a PUCCH to carry a one-bit HARQ-ACK based on the second mapping. The NW can interpret the received PUCCH as a two-bit HARQ-ACK and learn that PDSCH #2, scheduled by PDCCH #2, has failed to be received.

Embodiment 4-2

The UE may select the mapping for HARQ-ACK transmission based on whether or not one PDCCH is detected from one frequency field (serving cell and/or CC). In this case, the UE may operate the same regardless of whether or not a dynamic HARQ-ACK codebook is used.

The UE may select different mapping depending on whether or not one PDCCH is detected from one frequency field (serving cell and/or CC).

If the UE detects two PDCCHs from two frequency fields (serving cells and/or CCs), the UE may transmit a PUCCH in a PUCCH format for UCI of up to two bits based on the third mapping. When the NW detects the PUCCH to which a cyclic shift based on the third mapping is applied, the NW may interpret the two-bit HARQ-ACK based on the third mapping.

If the UE detects one PDCCH from one frequency field (serving cell and/or CC), the UE may transmit a PUCCH in a PUCCH format for UCI of up to two bits, based on the second mapping. When the NW detects a PUCCH to which a cyclic shift based on the second mapping is applied, the NW may interpret the one-bit HARQ-ACK based on the second mapping.

According to this mapping selection method, even when the UE fails to detect a PDCCH and ends up transmitting a one-bit HARQ-ACK while really a two-bit HARQ-ACK is supposed to be transmitted, it is still possible to prevent the NW from misidentifying the HARQ-ACK.

For example, even when the NW transmits PDCCHs #1 and #2 in the time direction, and the UE detects PDCCH #1 successfully and fails to detect PDCCH #2, and transmits a one-bit HARQ-ACK value (0 or 1) that is determined based on PDSCH #1 scheduled by PDCCH #1, the UE transmits a PUCCH carrying a one-bit HARQ-ACK, based on the second mapping. The NW identifies the one-bit HARQ-ACK as a two-bit HARQ-ACK value ({0, 0} or {1, 0}), so that the NW can correctly learn that PDSCH #2 has failed to be received.

Embodiment 4-3

The UE may select mapping based on whether or not a dynamic HARQ-ACK codebook is used.

When the UE is configured to use a semi-static HARQ-ACK codebook, the UE may transmit a PUCCH in a PUCCH format (PF 0 or PF 1) for UCI of up to two bits based on the third mapping.

According to this mapping selection method, for example, even when the NW transmits PDCCHs #1 and #2 in the time direction, and the UE detects PDCCH #1 successfully and fails to detect PDCCH #2, the UE still transmits a two-bit HARQ-ACK, so that the NW can correctly identify two-bit HARQ-ACKs.

When the UE is configured to use a dynamic HARQ-ACK codebook, the UE may transmit a PUCCH in a PUCCH format (PF 0 or PF 1) for UCI of up to two bits based on the second mapping.

According to this mapping selection method, even when the UE fails to detect a PDCCH and ends up transmitting a one-bit HARQ-ACK while really a two-bit HARQ-ACK is supposed to be transmitted, it is still possible to prevent the NW from misidentifying the HARQ-ACK.

For example, even when the UE is configured to use a dynamic HARQ-ACK codebook, the NW transmits PDCCHs #1 and #2 in the time direction, and the UE detects PDCCH #1 successfully, and fails to detect PDCCH #2, and transmits a one-bit HARQ-ACK value that is determined based on PDSCH #1 scheduled by PDCCH #1, the NW identifies the one-bit HARQ-ACK value (0 or 1) as a two-bit HARQ-ACK value ({0, 0} or {1, 0}), so that the NW can correctly learn that PDSCH #2 has failed to be received.

Embodiment 4-4

The UE may use the second mapping when transmitting HARQ-ACK of up to two bits. In this case, the UE may operate the same regardless of whether or not the dynamic HARQ-ACK codebook is used, whether or not one PDCCH is detected from one frequency field (serving cell and/or CC), or from which PDCCH and/or PDSCH the HARQ-ACK is obtained.

According to this mapping selection method, even when the UE fails to detect a PDCCH and ends up transmitting a one-bit HARQ-ACK while really a two-bit HARQ-ACK is supposed to be transmitted, it is still possible to prevent the NW from misidentifying the HARQ-ACK.

For example, even when the UE is configured to use a dynamic HARQ-ACK codebook, the NW transmits PDCCHs #1 and #2 in the time direction, and the UE detects PDCCH #1 successfully and fails to detect PDCCH #2, and transmits a one-bit HARQ-ACK value that is determined based on PDSCH #1 scheduled by PDCCH #1, the NW identifies the one-bit HARQ-ACK value (0 or 1) as a two-bit HARQ-ACK value ({0, 0} or {1, 0}), so that the NW can correctly learn that PDSCH #2 has failed to be received.

Fifth Embodiment

With a fifth embodiment of the present invention, the total DAI included in a PDSCH-scheduling PDCCH denotes the number of one or more DL assignments arranged along the time direction and/or the frequency direction (PDCCH identification method).

The counter DAI may show the number (index) of one or more DL assignments arranged along the time direction and/or the frequency direction.

In this case, when two PDCCHs are transmitted in the time direction, in PDCCH #1, the total DAI shows 2 and the counter DAI shows 1, while, in PDCCH #2, the total DAI shows 1 and the counter DAI shows 2. When one PDCCH is transmitted in the time direction, in PDCCH #1, the total DAI shows 1 and the counter DAI shows 1.

When the UE is configured to use a dynamic HARQ-ACK codebook, the UE may identify a detected PDCCH based on the total DAI and the counter DAI included in the PDCCH. If the UE detects at least one PDCCH, the UE may transmit a PUCCH to carry a two-bit HARQ-ACK based on the total DAI in this PDCCH.

When the UE fails to detect PDCCH #1 and detects PDCCH #2 successfully, since the total DAI included in the detected PDCCH #2 shows 2 and the counter DAI shows 2, the UE can still learn that PDCCH #1 has failed to be detected, and that PDCCH #2 has been detected successfully. The UE transmits a two-bit HARQ-ACK based on the decoding result of PDSCH #2.

When the UE detects PDCCH #1 successfully and fails to detect PDCCH #2, since the total DAI included in the detected PDCCH #1 shows 2 and the counter DAI shows 1, the UE can still learn that PDCCH #1 has been detected successfully and that PDCCH #2 has failed to be detected. The UE transmits a two-bit HARQ-ACK based on the decoding result of PDSCH #1.

According to the fifth embodiment, for example, even when the NW transmits PDCCHs #1 and #2 in the time direction, and the UE detects PDCCH #1 successfully and fails to detect PDCCH #2, the UE still transmits a two-bit HARQ-ACK based on the total DAI, so that the NW can correctly identify two-bit HARQ-ACKs.

Sixth Embodiment

According to a sixth embodiment of the present invention, the UE uses a PUCCH format and/or a PUCCH resource set that are suitable for the number of MIMO layers (PUCCH format determining method).

In NR, one Code Word (CW) and/or Transport Block (TB) is transmitted using up to four MIMO layers, and therefore the UE may transmit a one-bit HARQ-ACK if there are one to four MIMO layers, and the UE may transmit a two-bit HARQ-ACK if there are five to eight MIMO layers.

If the number of CWs and/or TBs in the PDSCH scheduled by one DL assignment (one PDCCH) detected by the UE is one (when a one-bit HARQ-ACK is provided in the MIMO-layer direction based on one PDCCH), the UE may use a PUCCH format (PF 0 or PF 1) for UCI of up to two bits.

If the number of CWs and/or TBs in the PDSCH scheduled by one DL assignment (one PDCCH) detected by the UE is two (when a two-bit HARQ-ACK is provided in the MIMO-layer direction based on one PDCCH), the UE may use a PUCCH format (PF 0 or PF 1) for UCI of up to two bits.

If the number of CWs and/or TBs in the PDSCHs that are respectively scheduled by two DL assignments (two PDCCHs) detected by the UE is one, (when a one-bit HARQ-ACK is provided from each of two PDCCHs in the MIMO-layer direction, and, together, a two-bit HARQ-ACK is obtained), the UE may use a PUCCH format (PF 2, PF 3 or PF 4) for UCI of more than two bits.

In this case, the UE transmits PF 0 or PF 1 if the UE detects both PDCCHs successfully, and transmits PF 2, PF 3, or PF 4 if the UE fails to detect one PDCCH. The NW performs blind detection for the two patterns of PUCCHs, so that the NW can learn that the UE has detected the PDCCHs.

If the number of CWs and/or TBs in the PDSCH that is scheduled by at least one of two DL assignments (two PDCCHs) detected by the UE is two, (when a two-bit HARQ-ACK is provided in the MIMO-layer direction based on at least one of the two PDCCHs, and, together, an HARQ-ACK of more than two bits (three bits or more) is obtained), the UE may use a PUCCH format (PF 2, PF 3 or PF 4) for UCI of more than two bits.

Note that, when the UE transmits a two-bit HARQ-ACK based on two CWs and/or TBs, the UE may use a PUCCH format (PF 0 or PF 1) for UCI of up to two bits. When the UE transmits a one-bit HARQ-ACK based on one CW and/or TB, the UE may use a PUCCH format (PF 2, PF 3 or PF 4) for UCI of more than two bits.

When the UE is configured to use a dynamic HARQ-ACK codebook and detects one PDCCH from one frequency field (serving cell and/or CC), and the number of CWs and/or TBs is one in both of the PDSCHs that are scheduled respectively by two DL assignments (two PDCCHs) detected by the UE (when one-bit HARQ-ACK is provided in the MIMO-layer direction based on each of the two PDCCHs, and, together, a two-bit HARQ-ACK is obtained), the UE may use a PUCCH format (PF 2, PF 3 or PF 4) for UCI of more than two bits.

Note that, instead of using a PUCCH format for UCI of more than two bits, the UE may use the second mapping and a PUCCH format (PF 0 or PF 1) for UCI of up to two bits. Also, instead of using a PUCCH format for UCI of more than two bits, the UE may use the third mapping and a PUCCH format (PF 0 or PF 1) for UCI of up to two bits.

When the UE transmits a two-bit HARQ-ACK in the MIMO layer (space layer) direction, the UE may use a PUCCH format (PF 0 or PF 1) for UCI of up to two bits. When the UE transmits a one-bit HARQ-ACK in the MIMO layer (space layer) direction, the UE may use a PUCCH format (PF 2, PF 3 or PF 4) for UCI of more than two bits.

According to this PUCCH format determining method, even when the UE fails to detect a PDCCH and ends up transmitting a one-bit HARQ-ACK while really a two-bit HARQ-ACK is supposed to be transmitted, it is still possible to prevent the NW from misidentifying the HARQ-ACK.

For example, when the UE is configured to use a dynamic HARQ-ACK codebook, the NW transmits PDCCHs #1 and #2 in the time direction, and the UE detects PDCCH #1 successfully and fails to detect PDCCH #2, the UE transmits a PUCCH to carry a one-bit HARQ-ACK by using PF 2, PF 3, or PF 4. Since the PUCCH has been received in PF 2, PF 3, or PF 4, the NW can recognize that the PUCCH indicates a one-bit HARQ-ACK, and the NW can recognize that one of PDSCH #1, scheduled by PDCCH #1 and PDSCH #2, scheduled by PDCCH #2 has failed to be received.

(Radio Communication System)

Now, the structure of a radio communication system according to one embodiment of the present invention will be described below. In this radio communication system, communication is performed using 1 of the radio communication methods according to the herein-contained embodiments of the present invention, or a combination of these.

Figure 11:
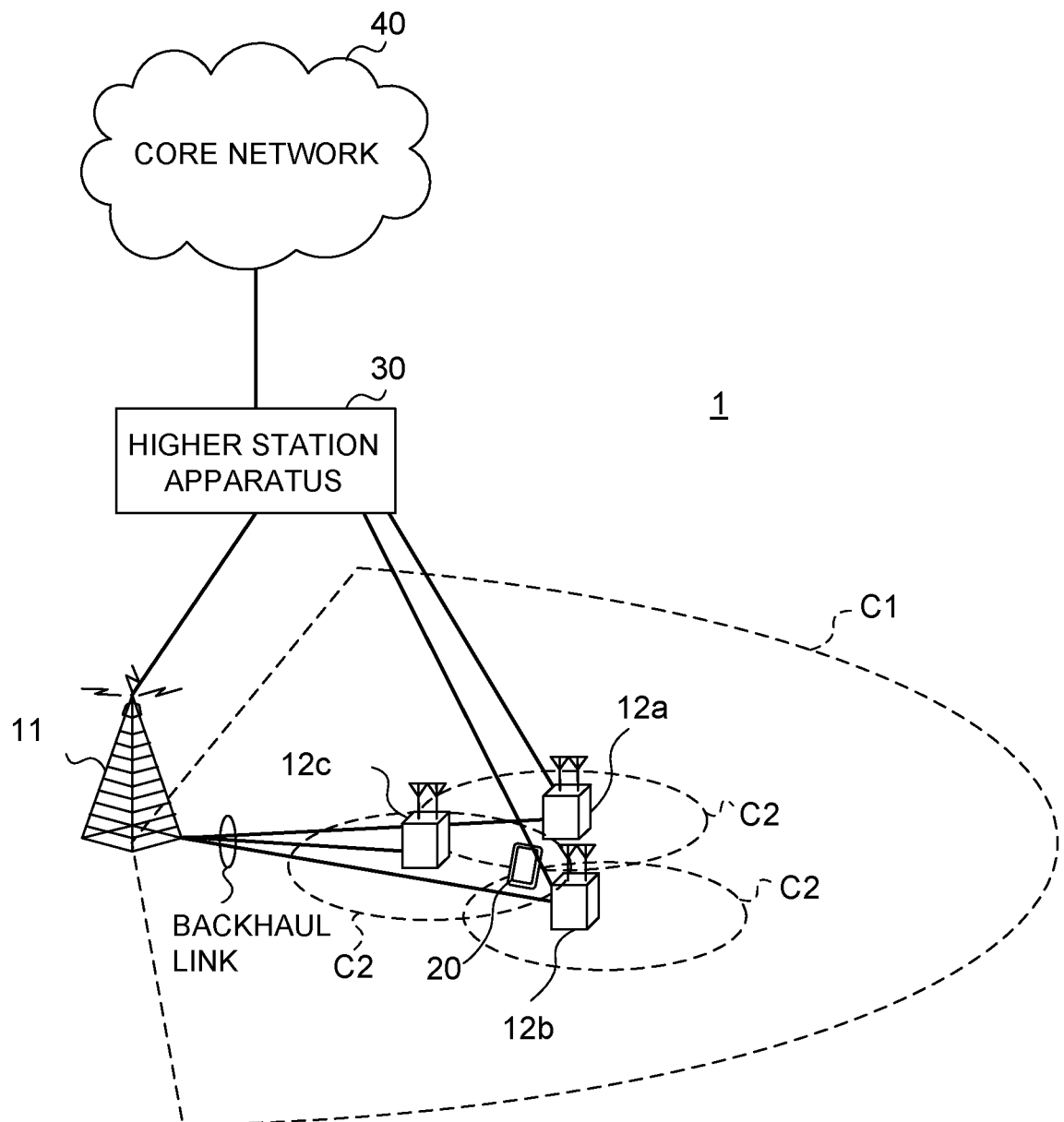
FIG. 11 is a diagram to show an exemplary schematic structure of a radio communication system according to the present embodiment.

FIG. 11 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long-term evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access),"

"New-RAT (Radio Access Technology)," and so on, or may be seen as a system to implement these.

The radio communication system 1 includes a radio base station 11 that forms a macro cell C1, with a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and the number of cells and user terminals 20 and so forth are not limited to those illustrated in the drawings.

The user terminals 20 can connect with both the radio base station 11 and the radio base stations 12. The user terminals 20 are expected to use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

The radio base station 11 and a radio base station 12 (or two radio base stations 12) may be connected with each other by cables (for example, by optical fiber in compliance with the CPRI (Common Public Radio Interface), the X2 interface, and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but these are by no means limiting. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands that are each formed with one or contiguous resource blocks, per terminal, and allowing a plurality of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, the DCI to schedule receipt of DL data may be referred to as "DL assignment," and the DCI to schedule transmission of UL data may also be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACKs/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 12:
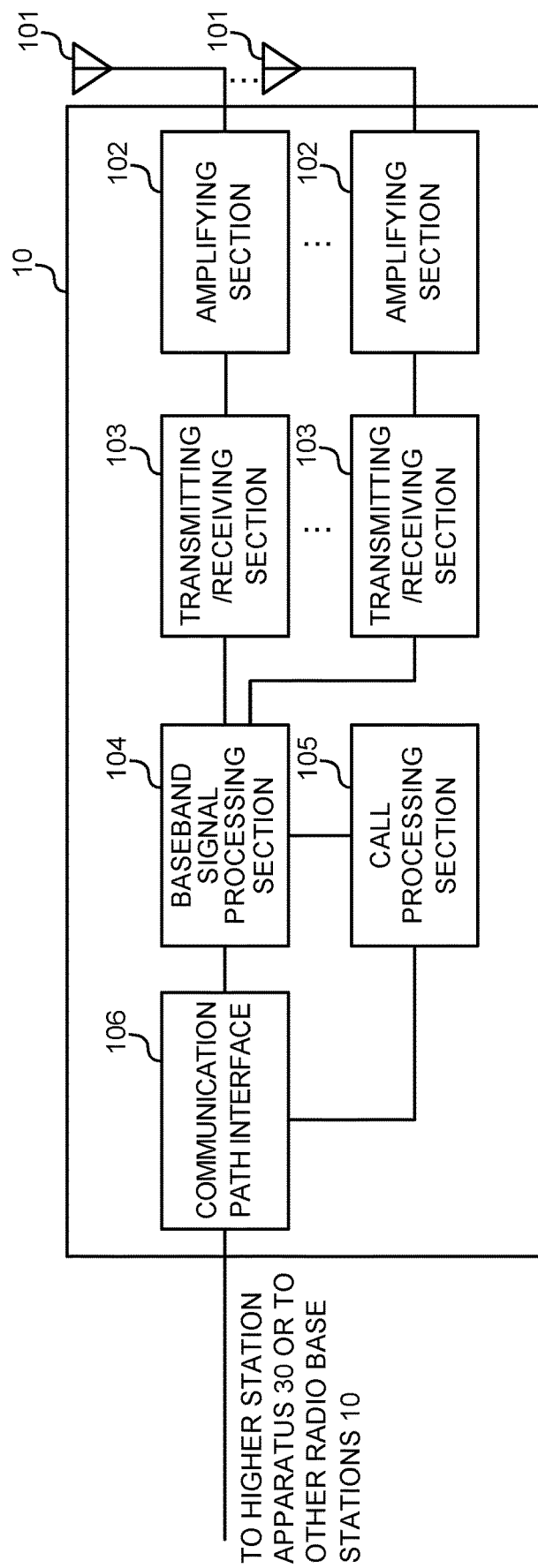
FIG. 12 is a diagram to show an exemplary overall structure of a radio base station according to the present embodiment.

FIG. 12 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30, to the baseband signal processing section 104, via the communication path interface 106.

In the baseband signal processing section 104, the user data is subjected to transmission processes, including a Packet Data Convergence Protocol (PDCP) layer process, user data division and coupling, Radio Link Control (RLC) layer transmission processes such as RLC retransmission control, Medium Access Control (MAC) retransmission control (for example, an Hybrid Automatic Repeat reQuest (HARD) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base station 10, and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Figure 13:
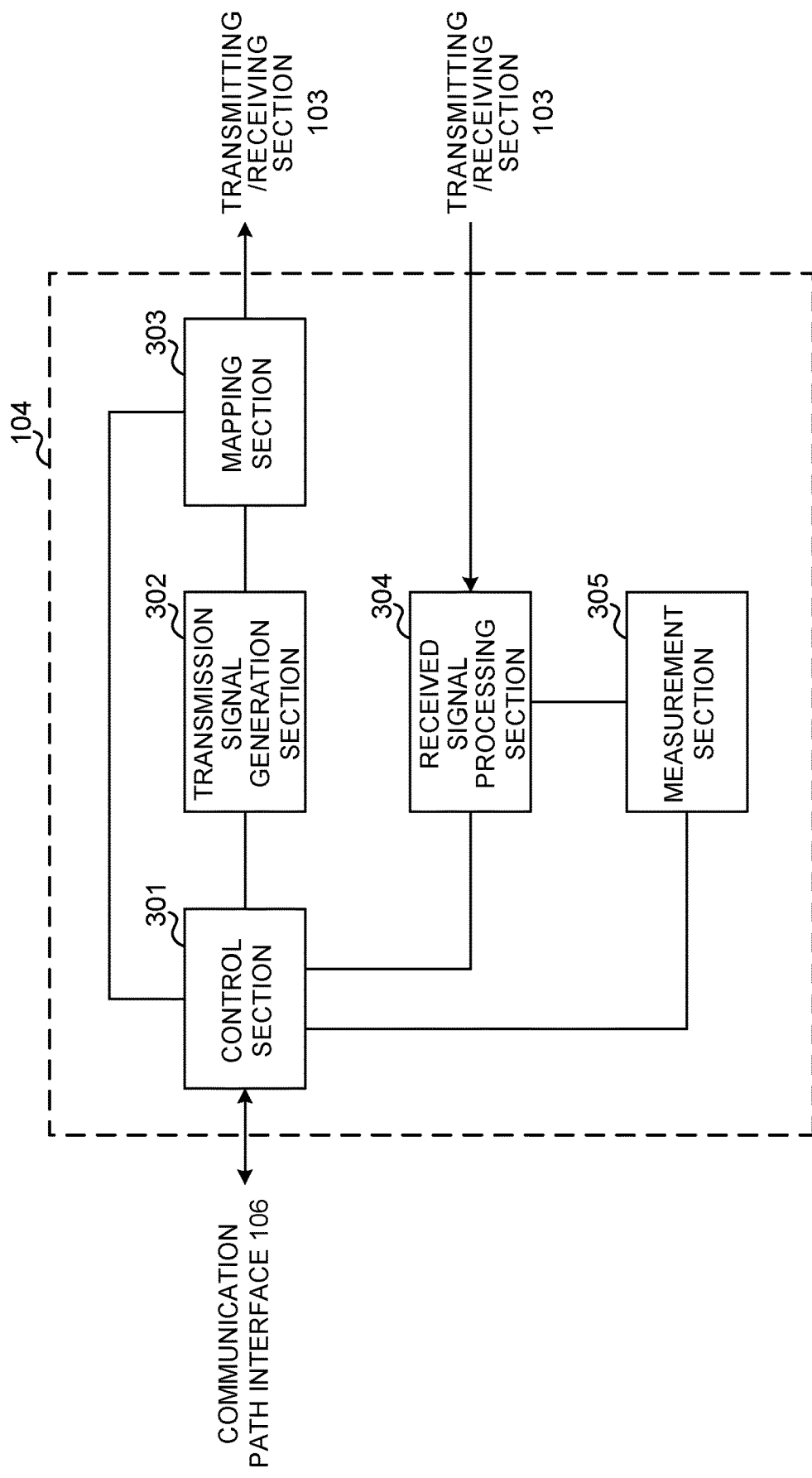
FIG. 13 is a diagram to show an exemplary functional structure of a radio base station according to the present embodiment.

FIG. 13 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals in the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals, and so on based on the results of deciding whether or not retransmission control is necessary for uplink data signals, and so on. Also, the control section 301 controls the scheduling of synchronization signals (for example, Primary Synchronization Signal (PSS)/Secondary Synchronization Signal (SSS)), downlink reference signals (for example, CRS, CSI-RS, DMRS, etc.) and so on.

The control section 301 controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and so on.

Also, the control section 301 may identify the uplink control channel PUCCH format of the uplink control channel (PUCCH) that is received.

The transmission signal generation section 302 generates downlink signals (downlink control signals, downlink data signals, downlink reference signals, and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, downlink data signals are subjected to the coding process, the modulation process and so on, by using coding rates, modulation schemes and so forth that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). The received signal processing section 304 can be constituted by a signal processor, a signal processing circuit or signal processing apparatus that can be described based on general understanding of the technical field to which the present invention pertains.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform Radio Resource Management (RRM) measurements, Channel State Information (CSI) measurements, and so on, based on the received signals. The measurement section 305 may measure the received power (for example, Reference Signal Received Power (RSRP)), the received quality (for example, Reference Signal Received Quality (RSRQ), Signal to Interference plus Noise Ratio (SINR), etc.), the signal strength (for example, Received Signal Strength Indicator (RSSI)), transmission path information (for example, CSI) and so on. The measurement results may be output to the control section 301.

(User Terminal)

Figure 14:
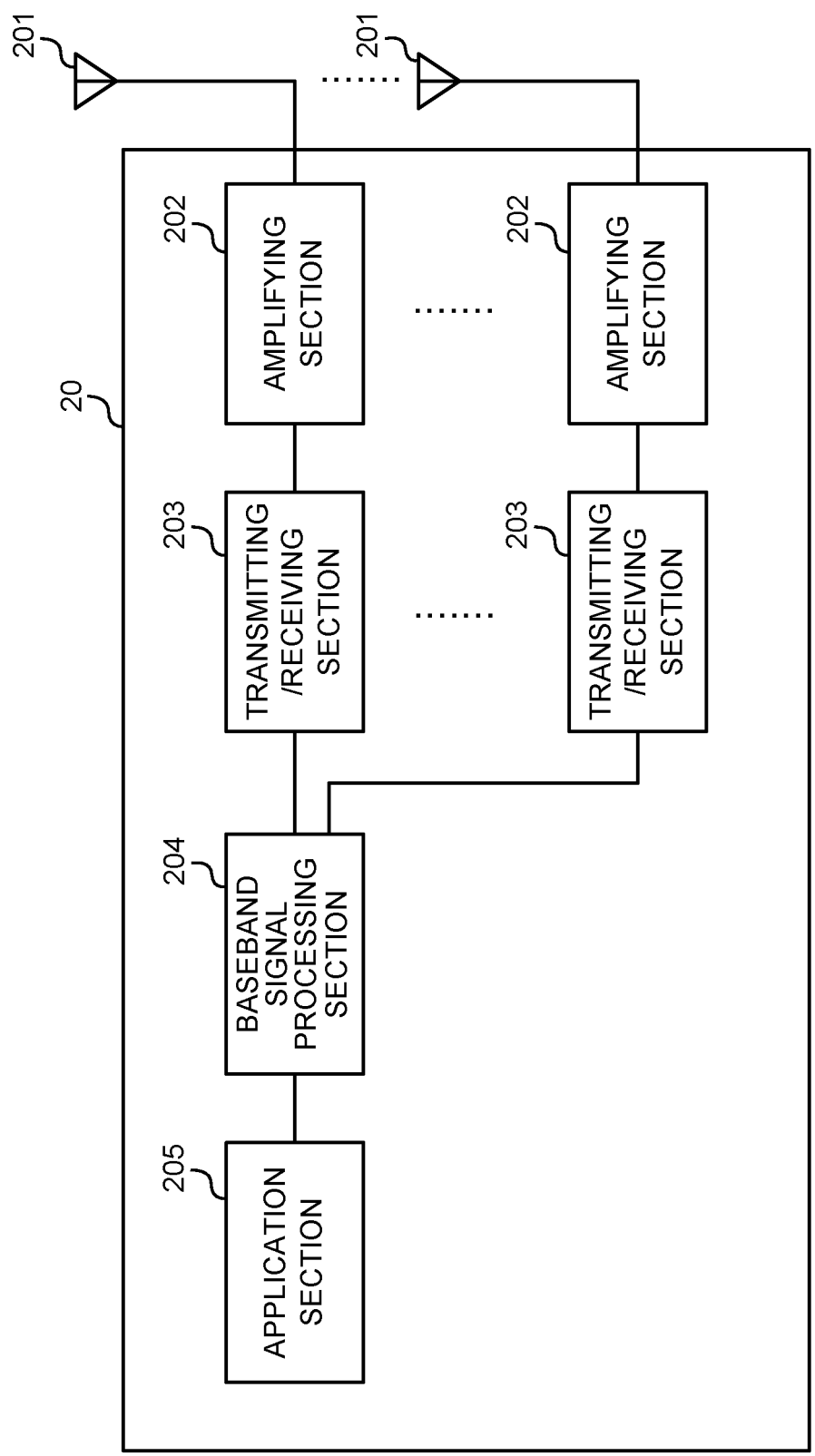
FIG. 14 is a diagram to show an exemplary overall structure of a user terminal according to the present embodiment.

FIG. 14 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204, and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process, and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive at least one downlink control channel (PDCCH, DL assignment, etc.) and receive at least one downlink shared channel (PDSCH) that is scheduled by the downlink control channel. Also, the transmitting/receiving sections 203 may transmit an uplink control channel that carries a delivery acknowledgment signal (for example, an HARQ-ACK) in response to at least one downlink shared channel.

Figure 15:
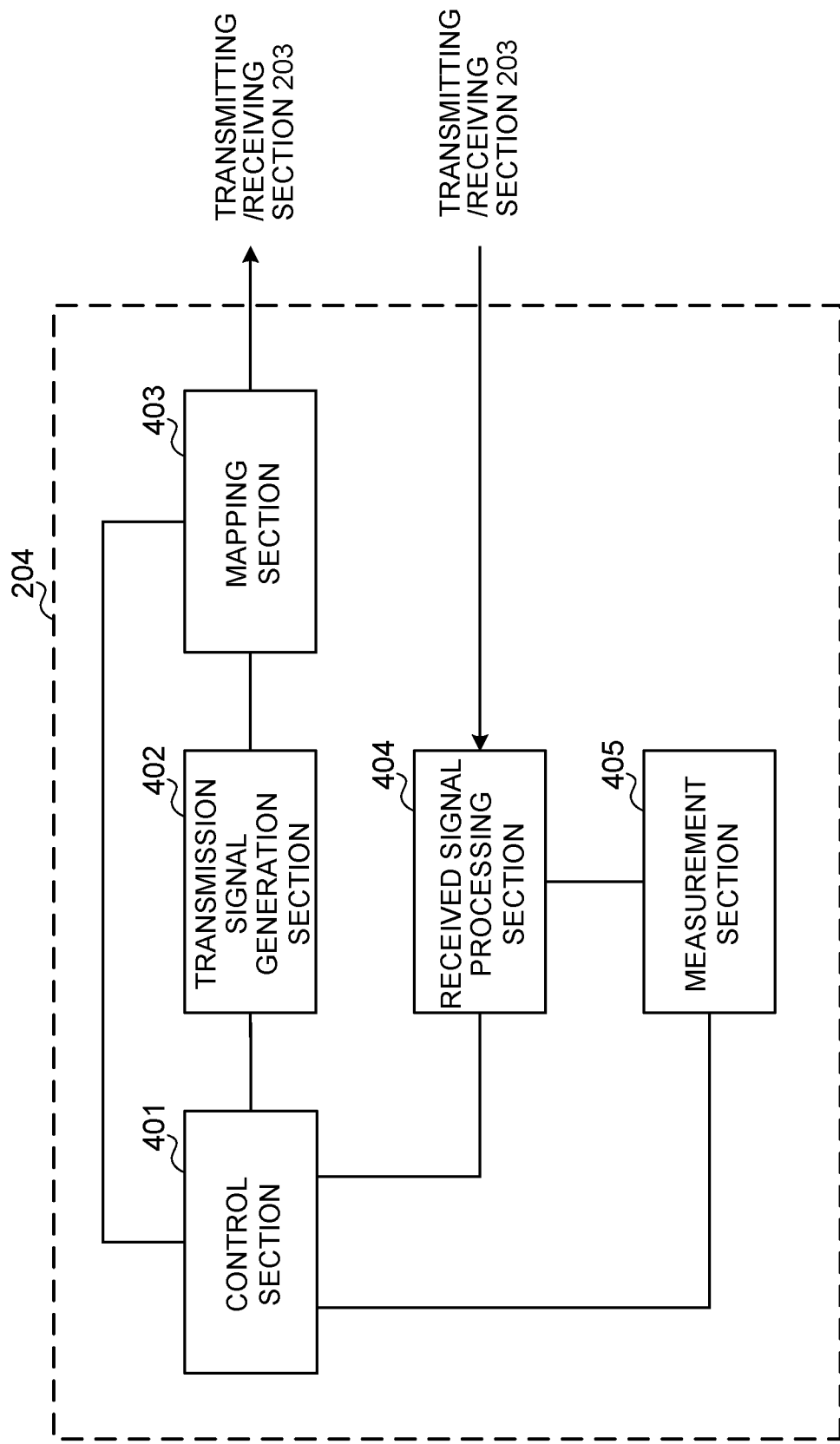
FIG. 15 is a diagram to show an exemplary functional structure of a user terminal according to the present embodiment.

FIG. 15 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404, and a measurement section 405. Note that these configurations have only to be included in the user terminal 20, and some or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401 controls, for example, the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on results of deciding whether or not retransmission control is necessary for the downlink control signals and/or downlink data signals, and so on.

Furthermore, the control section 401 may control the transmission of delivery acknowledgment signals by using at least one of uplink control channel formats (PUCCH formats) and mapping (for example, one of the first to third mappings) of delivery acknowledgment signals, which are associated with at least one of whether or not configuration for using a dynamic delivery acknowledgment signal codebook (for example, a dynamic HARQ-ACK codebook) for the at least one downlink shared channel is configured, the number of bits of the delivery acknowledgment signal in response to the downlink shared channel, whether or not at least one downlink assignment is transmitted by one frequency resource (for example, a serving cell or CC), and the number of codewords (and/or the number of transport blocks or the number of MIMO layers) of the at least one downlink shared channel.

Furthermore, in mapping (for example, second mapping), at least one of a cyclic shift and a complex-valued modulation symbol that is mapped to the value 0 of a one-bit delivery acknowledgment signal may be equal to at least one of a cyclic shift and a complex-valued modulation symbol mapped to a two-bit delivery acknowledgment signal of (0, 0), and at least one of a cyclic shift and a complex-valued modulation symbol mapped to the value 1 of a one-bit delivery acknowledgment signal may be equal to at least one of a cyclic shift and a complex-valued modulation symbol mapped to a two-bit delivery acknowledgment signal of (1, 0).

In mapping (for example, second mapping), at least one of a cyclic shift and a complex-valued modulation symbol mapped to a scheduling request and the value 0 of a one-bit delivery acknowledgment signal may be equal to at least one of a cyclic shift and a complex-valued modulation symbol mapped to a scheduling request and a two-bit delivery acknowledgment signal of (0, 0), and at least one of a cyclic shift and a complex-valued modulation symbol mapped to a scheduling request and the value 1 of a one-bit delivery acknowledgment signal may be equal to at least one of a cyclic shift and a complex-valued modulation symbol mapped to a scheduling request and a two-bit delivery acknowledgment signal of (1, 0).

Furthermore, the control section 401 may select at least one of an uplink control channel format and mapping based on at least one of whether or not configuration for using a dynamic delivery acknowledgment signal codebook for the at least one downlink shared channel is configured, the number of bits of the delivery acknowledgment signal in response to the downlink shared channel, whether or not at least one downlink assignment is transmitted by one frequency resource, and the number of codewords (and/or the number of transport blocks or the number of MIMO layers) of the at least one downlink shared channel.

Also, when a plurality of downlink control channels, where at least one downlink assignment is allocated to different time resources, are used, a downlink assignment indicator (for example, a total DAI), included in each of the plurality of downlink control channels, may show the number of these downlink control channels.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit, or signal generating apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for received signals that are input from the transmitting/receiving sections 203. Here, the received signals include, for example, downlink signals (downlink control signals, downlink data signals, downlink reference signals, and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present disclosure.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

(Hardware Structure)

Note that the block diagrams that have been used to describe the above embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 16:
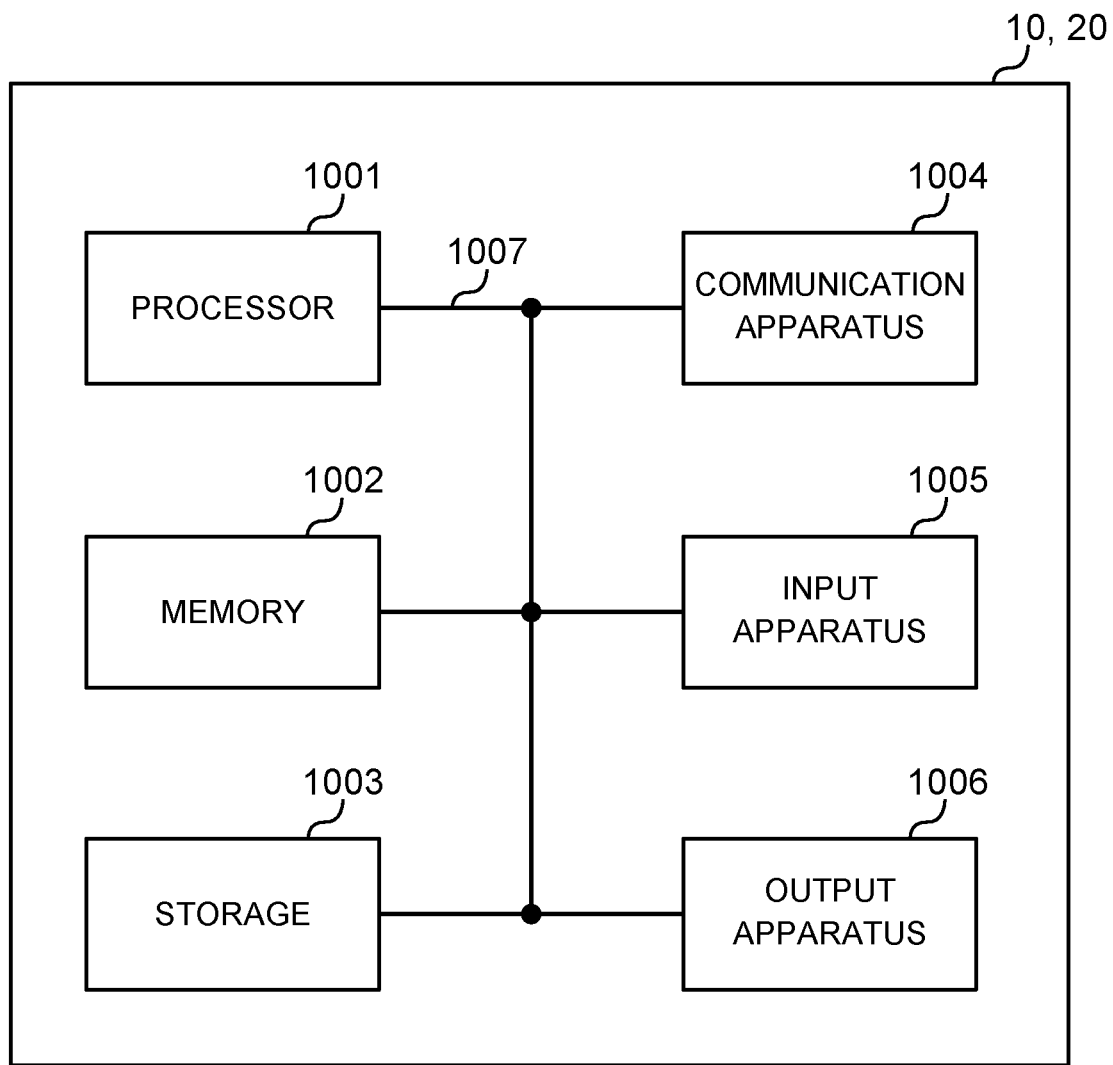
FIG. 16 is a diagram to show an exemplary hardware structure of a radio base station and a user terminal according to the present embodiment.

For example, the radio base station, user terminals and so on according to one embodiment of the present invention may function as a computer that executes the processes of the radio communication method of the present invention. FIG. 16 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. Note that, the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read given software (programs), and allowing the processor 1001 to do calculations, control communication that involves the communication apparatus 1004, control the reading and/or writing of data in the memory 1002 and the storage 1003, and so on.

The processor 1001 may control the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so forth from the storage 1003 and/or the communication apparatus 1004, into the memory 1002, and executes various processes according to these. As for the programs, programs to allow computers to execute at least part of the operations of the above-described embodiment may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)," and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using cable and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer and so on, in order to implement, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for allowing sending output to outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an Application-Specific Integrated Circuit (ASIC), a Programmable Logic Device (PLD), a Field Programmable Gate Array (FPGA) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, a "channel" and/or a "symbol" may be replaced by a "signal" (or "signaling"). Also, a "signal" may be a "message." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or more periods (frames) in the time domain. One or more periods (frames) that constitute a radio frame may be each referred to as a "subframe." Furthermore, a subframe may be comprised of one or multiple slots in the time domain. A subframe may be a fixed time duration (for example, 1 ms), which does not depend on numerology.

Furthermore, a slot may be comprised of one or more symbols in the time domain (Orthogonal Frequency Division Multiplexing (OFDM) symbols, Single Carrier Frequency Division Multiple Access (SC-FDMA) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a plurality of contiguous subframes may be referred to as a "TTI," or one slot or one minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is not limited to this.

A TTI may be the transmission time unit of channel-encoded data packets (transport blocks), code blocks and/or codewords, or may be the unit of processing in scheduling, link adaptation, and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit for scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," a "minislot," a "sub-slot," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of contiguous subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols, and so on described above are simply examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs), and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (Physical Uplink Control CHannel (PUCCH), Physical Downlink Control CHannel (PDCCH) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

The method of reporting information is by no means limited to those used in the examples/embodiments described in this specification, and other methods may be used as well. For example, reporting of information may be implemented by using physical layer signaling (for example, downlink control information (DCI), uplink control information (UCI)), higher layer signaling (for example, Radio Resource Control (RRC) signaling, broadcast information (the master information block (MIB), system information blocks (SIBs) and so on), Medium Access Control (MAC) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell," and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other suitable terms.

Furthermore, the radio base stations in this specification may be interpreted as user terminals. For example, the examples/embodiments of the present disclosure may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, Mobility Management Entities (MMEs), Serving-Gateways (S-GWs), and so on may be possible, but these are not limiting) other than base stations, or combinations of these.

The examples/embodiments illustrated in this specification may be used individually or in combinations, which may be switched depending on the mode of implementation. Also, the order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining, and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives at least one downlink shared channel scheduled by at least one downlink control channel; and
   a processor that controls, when configured to use a dynamic delivery acknowledgment signal codebook for the at least one downlink shared channel, to transmit a delivery acknowledgment signal for the at least one downlink shared channel based on a value of a total downlink assignment indicator included in the at least one downlink control channel,
   wherein, when the at least one downlink control channel is allocated to different time resources, the value of the total downlink assignment indicator included in each of the at least one downlink control channel denotes a number of downlink control channel detections arranged along a time direction and a frequency direction.

2. The terminal according to claim 1, wherein, in a mapping of the delivery acknowledgment signal, at least one of a cyclic shift and a complex-valued modulation symbol that are mapped to a value 0 of a one-bit delivery acknowledgment signal is equal to at least one of a cyclic shift and a complex-valued modulation symbol that are mapped to a two-bit delivery acknowledgment signal of (0, 0), and at least one of a cyclic shift and a complex-valued modulation symbol that are mapped to a value 1 of a one-bit delivery acknowledgment signal is equal to at least one of a cyclic shift and a complex-valued modulation symbol that are mapped to a two-bit delivery acknowledgment signal of (1, 0).

3. The terminal according to claim 1, wherein, in a mapping of the delivery acknowledgment signal, at least one of a cyclic shift and a complex-valued modulation symbol that are mapped to a scheduling request and a value 0 of a one-bit delivery acknowledgment signal is equal to at least one of a cyclic shift and a complex-valued modulation symbol that are mapped to a scheduling request and a two-bit delivery acknowledgment signal of (0, 0), and at least one of a cyclic shift and a complex-valued modulation symbol that are mapped to a scheduling request and a value 1 of a one-bit delivery acknowledgment signal is equal to at least one of a cyclic shift and a complex-valued modulation symbol that are mapped to a scheduling request and a two-bit delivery acknowledgment signal of (1, 0).

4. The terminal according to claim 1, wherein the processor determines a number of delivery acknowledgment signal bits based on the value of the total downlink assignment indicator.

5. A radio communication method for a terminal, comprising:
   receiving at least one downlink shared channel scheduled by at least one downlink control channel; and when configured to use a dynamic delivery acknowledgment signal codebook for the at least one downlink shared channel,
   controlling to transmit the delivery acknowledgment signal for the at least one downlink shared channel based on a value of a total downlink assignment indicator included in the at least one downlink control channel,
   wherein, when the at least one downlink control channel is allocated to different time resources, the value of the total downlink assignment indicator included in each of the at least one downlink control channel denotes a number of downlink control channel detections arranged along a time direction and frequency direction.

6. A base station comprising:
a transmitter that transmits to a terminal at least one downlink control channel for scheduling at least one downlink shared channel; and
a receiver that receives from the terminal, when the terminal is configured to use a dynamic delivery acknowledgment signal codebook for the at least one downlink shared channel, the delivery acknowledgment signal for the at least one downlink shared channel, which is transmitted based on a value of a total downlink assignment indicator included in the at least one downlink control channel,
wherein, when the at least one downlink control channel is allocated to different time resources, the value of the total downlink assignment indicator included in each of the at least one downlink control channel denotes a number of downlink control channel detections arranged along a time direction and a frequency direction.

7. The terminal according to claim 2, wherein, in a mapping of the delivery acknowledgment signal, at least one of a cyclic shift and a complex-valued modulation symbol that are mapped to a scheduling request and a value 0 of a one-bit delivery acknowledgment signal is equal to at least one of a cyclic shift and a complex-valued modulation symbol that are mapped to a scheduling request and a two-bit delivery acknowledgment signal of (0, 0), and at least one of a cyclic shift and a complex-valued modulation symbol that are mapped to a scheduling request and a value 1 of a one-bit delivery acknowledgment signal is equal to at least one of a cyclic shift and a complex-valued modulation symbol that are mapped to a scheduling request and a two-bit delivery acknowledgment signal of (1, 0).

8. A system comprising a terminal and a base station, wherein
the terminal comprises:
a receiver that receives at least one downlink shared channel scheduled by at least one downlink control channel; and
a processor that controls, when configured to use a dynamic delivery acknowledgment signal codebook for the at least one downlink shared channel, to transmit a delivery acknowledgment signal for the at least one downlink shared channel based on a value of a total downlink assignment indicator included in the at least one downlink control channel, and
the base station comprises:
a transmitter that transmits to the terminal at least one downlink control channel; and
a receiver that receives from the terminal, when the terminal is configured to use a dynamic delivery acknowledgment signal codebook for the at least one downlink shared channel, the delivery acknowledgment signal for the at least one downlink shared channel, which is transmitted based on a value of the total downlink assignment indicator,
wherein, when the at least one downlink control channel is allocated to different time resources, the value of the total downlink assignment indicator included in each of the at least one downlink control channel denotes a number of downlink control channel detections arranged along a time direction and a frequency direction.

* * * * *